US010841059B2

(12) United States Patent
Park et al.

(10) Patent No.: US 10,841,059 B2
(45) Date of Patent: Nov. 17, 2020

(54) METHOD OF SOUNDING A TERMINAL IN A WIRELESS COMMUNICATION SYSTEM AND APPARATUS THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR); Minki Ahn, Seoul (KR); Kukheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/291,988

(22) Filed: Mar. 4, 2019

(65) Prior Publication Data

US 2019/0199497 A1  Jun. 27, 2019

Related U.S. Application Data

(63) Continuation of application No. 16/064,345, filed as application No. PCT/KR2018/005073 on May 2, 2018.

(Continued)

(51) Int. Cl.
*H04L 5/00* (2006.01)
*H04L 27/26* (2006.01)
(Continued)

(52) U.S. Cl.
CPC .......... *H04L 5/0048* (2013.01); *H04B 7/043* (2013.01); *H04B 7/0417* (2013.01);
(Continued)

(58) Field of Classification Search
CPC ......... H04W 72/0413; H04W 72/0446; H04W 56/001; H04L 5/0048; H04L 5/0023;
(Continued)

(56) References Cited

U.S. PATENT DOCUMENTS

2011/0268028 A1* 11/2011 Stern-Berkowitz .......................... H04L 5/0048
370/328
2012/0263129 A1* 10/2012 Noh ........................ H04L 5/001
370/329

(Continued)

FOREIGN PATENT DOCUMENTS

KR  1020150030661   3/2015

OTHER PUBLICATIONS

Huawei, HiSilicon, "UL SRS design for CSI acquisition and beam management," R1-1704241, 3GPP TSG RAN WG1 Meeting #88bis, Spokane, USA, dated Mar. 25, 2017, 18 pages.

(Continued)

*Primary Examiner* — Rownak Islam
(74) *Attorney, Agent, or Firm* — Fish & Richardson P.C.

(57) ABSTRACT

One embodiment according to the present invention, with respect to a sounding method of user equipment (UE) in a wireless communication system, comprises the steps of: receiving configuration of one or more sounding reference signal (SRS) resource sets from a base station; receiving, from the base station, activation command information commanding the SRS transmission activation of a particular SRS resource set from among the one or more SRS resource sets; and transmitting, to the base station, the SRS corresponding to the particular SRS resource set, wherein the reference signal, for which a spatial relationship is assumed for each SRS resource included in the particular SRS resource set, can be determined on the basis of the activation command information.

14 Claims, 15 Drawing Sheets

Related U.S. Application Data

(60) Provisional application No. 62/504,551, filed on May 11, 2017, provisional application No. 62/492,938, filed on May 1, 2017.

(51) Int. Cl.

| | |
|---|---|
| *H04B 7/06* | (2006.01) |
| *H04B 7/0426* | (2017.01) |
| *H04B 7/0456* | (2017.01) |
| *H04B 7/0417* | (2017.01) |
| *H04W 56/00* | (2009.01) |
| *H04W 72/04* | (2009.01) |
| *H04B 7/0404* | (2017.01) |

(52) U.S. Cl.
CPC ......... *H04B 7/0456* (2013.01); *H04B 7/0615* (2013.01); *H04B 7/0695* (2013.01); *H04L 5/0023* (2013.01); *H04L 5/0051* (2013.01); *H04L 5/0053* (2013.01); *H04L 5/0094* (2013.01); *H04L 27/2607* (2013.01); *H04L 27/2613* (2013.01); *H04W 56/001* (2013.01); *H04W 72/0413* (2013.01); *H04W 72/0446* (2013.01); *H04B 7/0404* (2013.01); *H04L 5/0082* (2013.01)

(58) Field of Classification Search
CPC ... H04L 5/0051; H04L 5/0053; H04L 5/0082; H04L 5/0094; H04L 27/2707; H04L 27/2713; H04B 7/0417; H04B 7/043; H04B 7/0456; H04B 7/0615; H04B 7/0695; H04B 7/0404
USPC ........................................................ 370/329
See application file for complete search history.

(56) References Cited

U.S. PATENT DOCUMENTS

| | | | |
|---|---|---|---|
| 2013/0322280 A1* | 12/2013 | Pi ..................... | H04W 72/0413 370/252 |
| 2014/0016602 A1 | 1/2014 | Papasakellariou et al. | |
| 2017/0367046 A1* | 12/2017 | Papasakellariou .......................... | H04W 52/0216 |
| 2018/0048498 A1* | 2/2018 | Stern-Berkowitz ......................... | H04L 5/0048 |
| 2018/0279297 A1* | 9/2018 | Nogami ................... | H04L 1/08 |
| 2018/0287682 A1* | 10/2018 | Kwak .................. | H04B 7/0626 |
| 2018/0287757 A1* | 10/2018 | Onggosanusi ........ | H04L 5/0053 |
| 2018/0302796 A1* | 10/2018 | Zhang .................. | H04L 5/0098 |

OTHER PUBLICATIONS

ZTE, ZTE Microelectronics, "Discussion on SRS design for NR," R1-1704414, Spokane, USA, dated Mar. 25, 2017, 5 pages.

Guangdong OPPO Mobile Telecom, "On SRS design for NR," R1-1704612, 3GPP TSG RAN WG1 Meeting #88bis, Spokane, USA, dated Mar. 24, 2017, 6 pages.

Huawei, HiSilicon, "UL beam management," R1-1704231, 3GPP TSG RAN WG1 Meeting #88b, Spokane, USA, dated Apr. 3-7, 2017, 7 pages.

NTT Docomo, Inc., "Workplan for Study on NR Access Technology," R1-1702795, 3GPP TSG RAN WG1 Meeting #88, Athens, Greece, dated Feb. 13-17, 2017, 136 pages.

ZTE, ZTE Microelectronics, "UL beam management," R1-1704399, 3GPP TSG RAN WG1 Meeting #88bis, Spokane, USA, dated Apr. 3-7, 2017, 4 pages.

LG Electronics, "Discussion on UL beam management," R1-1704878, 3GPP TSG RAN WG1 Meeting #88bis, Spokane, USA, dated Apr. 3-7, 2017, 6 pages.

ZTE, ZTE Microelectronics, "QCL/QCB design for UL MIMO," R1-1704416, 3GPP TSG RAN WG1 Meeting #88bis, Spokane, USA, dated Apr. 3-7, 2017, 6 pages.

Extended European Search Report in European Application No. 18794887.2, dated Jul. 23, 2019, 12 pages.

United States Office Action in U.S. Appl. No. 16/064,345, dated Jul. 11, 2019, 29 pages.

European Office Action in European Appln. No. 18794887.2, dated Sep. 17, 2020, 10 pages.

Intel Corporation, "Details for DL Beam Management," R1-1707355, 3GPP TSG-RAN WG1 #89, Hangzhou, China, May 15-19, 2017, 11 pages.

LG Electronics, "Discussion on UL beam management," R1- 1707605, 3GPP TSG RAN WG1 Meeting #89, Hangzhou, China May 15-19, 2017, 6 pages.

* cited by examiner

[FIG. 1]
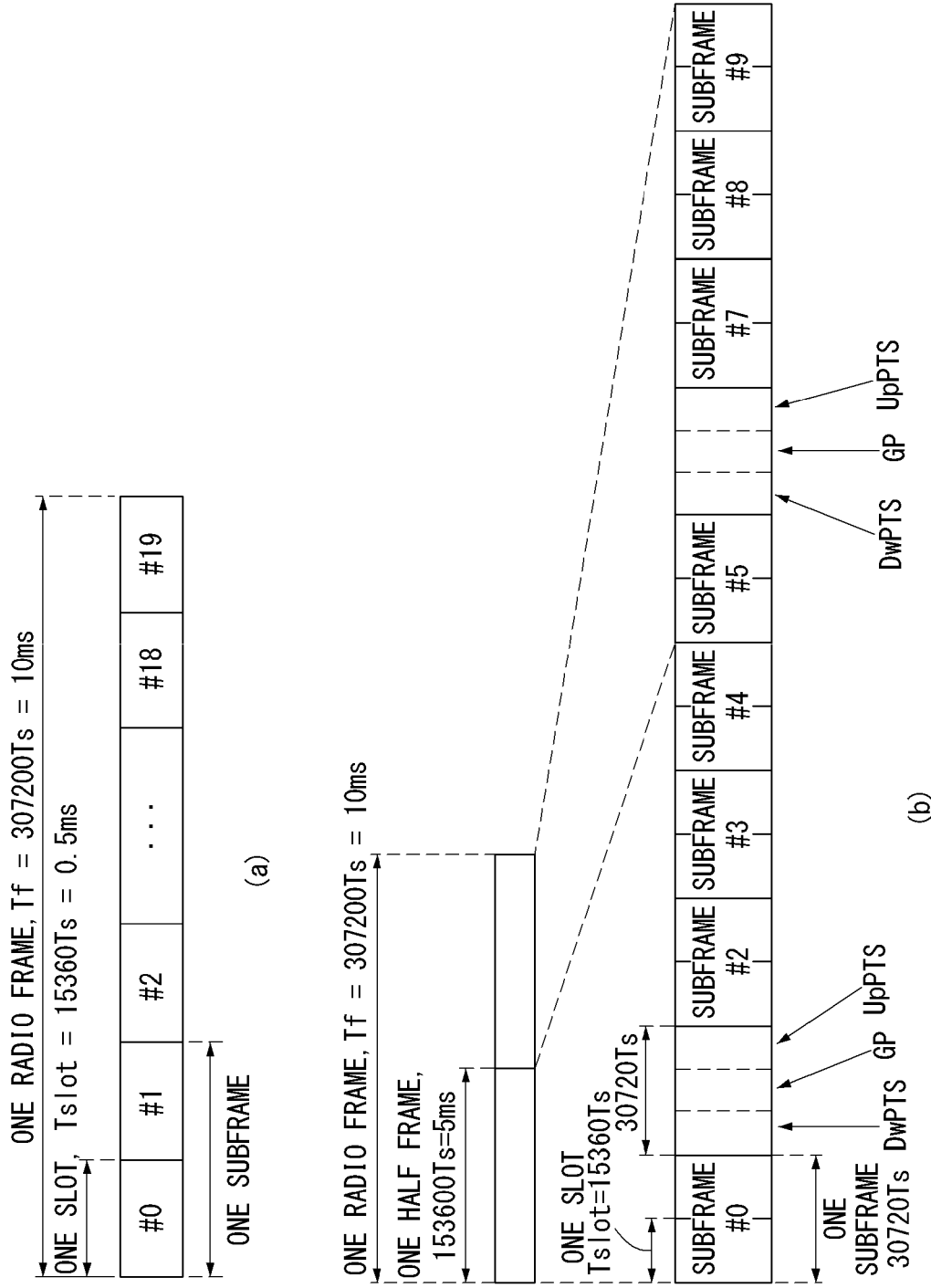

[FIG. 2]
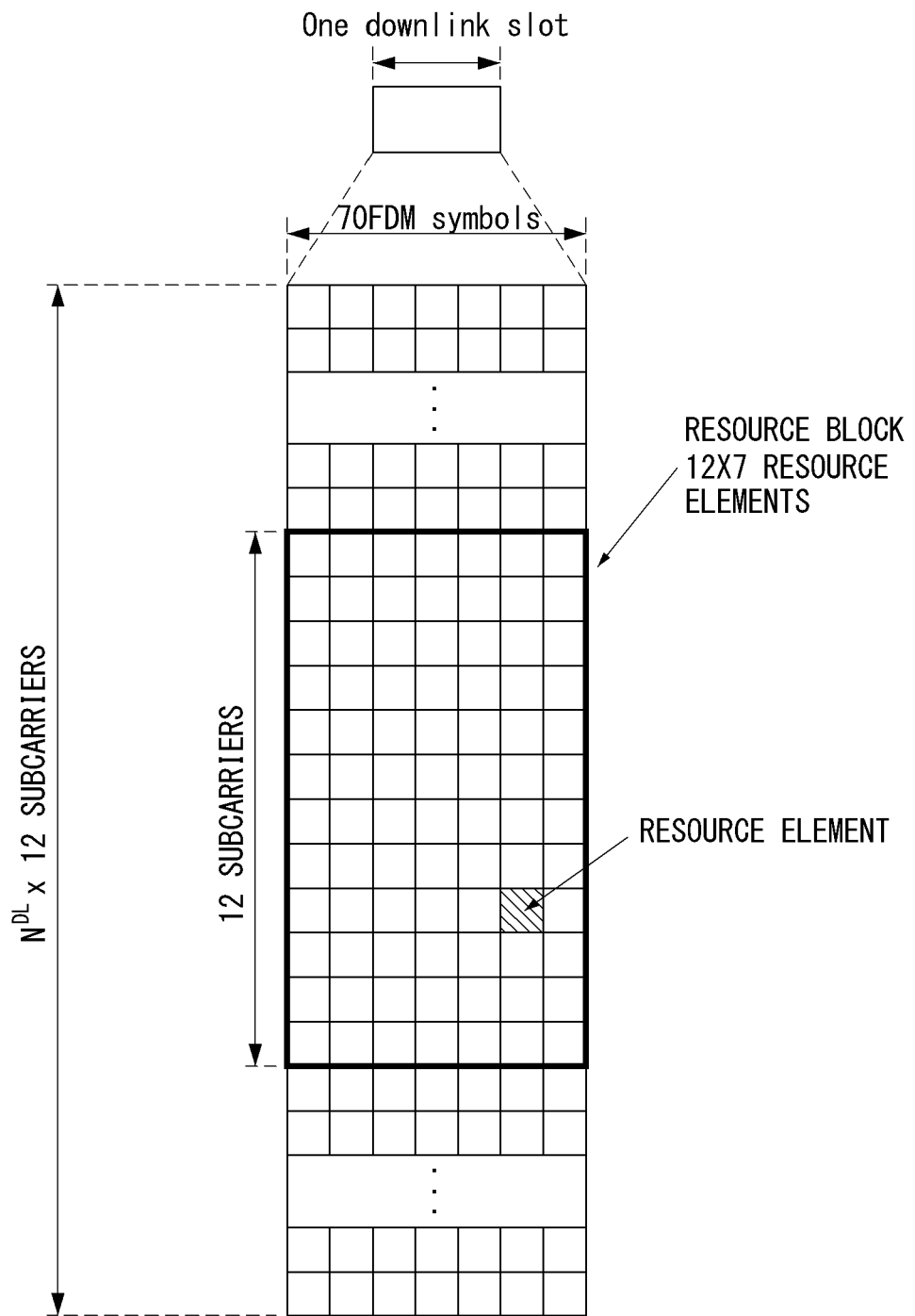

[FIG. 3]
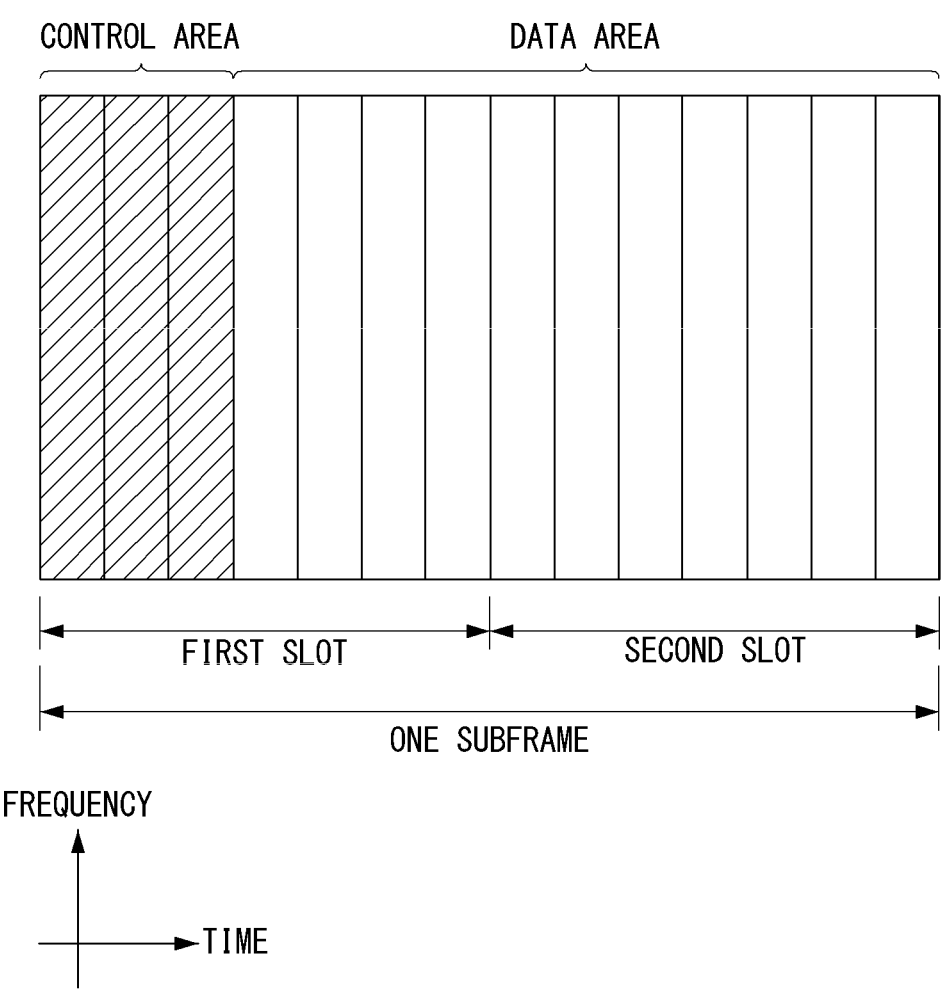

[FIG. 4]
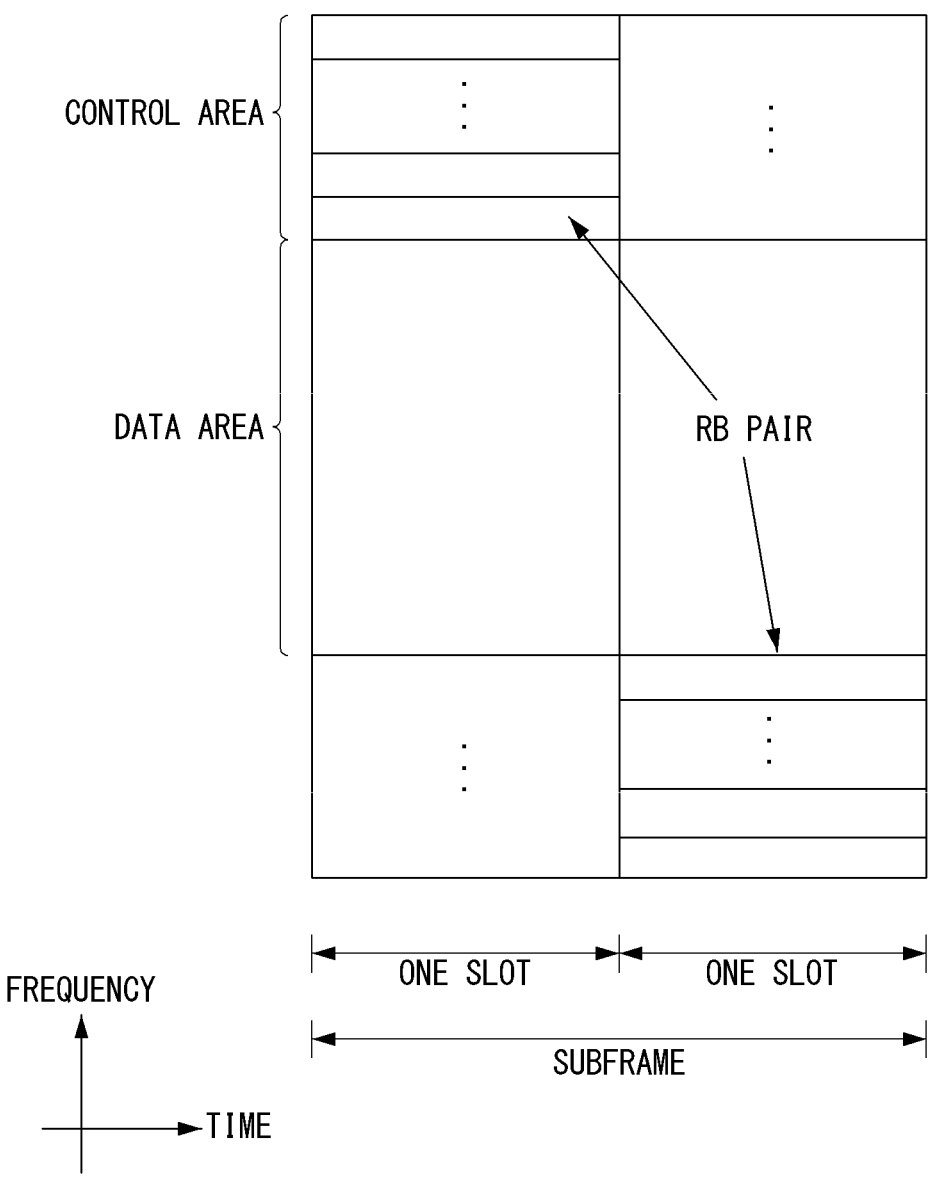

[FIG. 5]
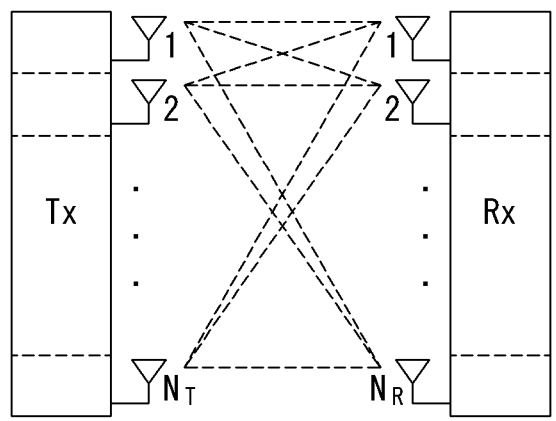
[FIG. 6]
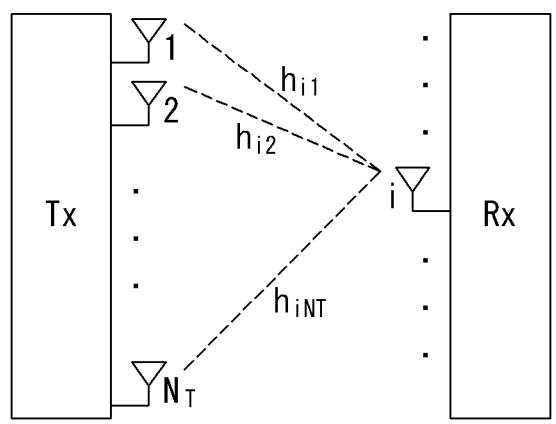

[FIG. 7]
(a)
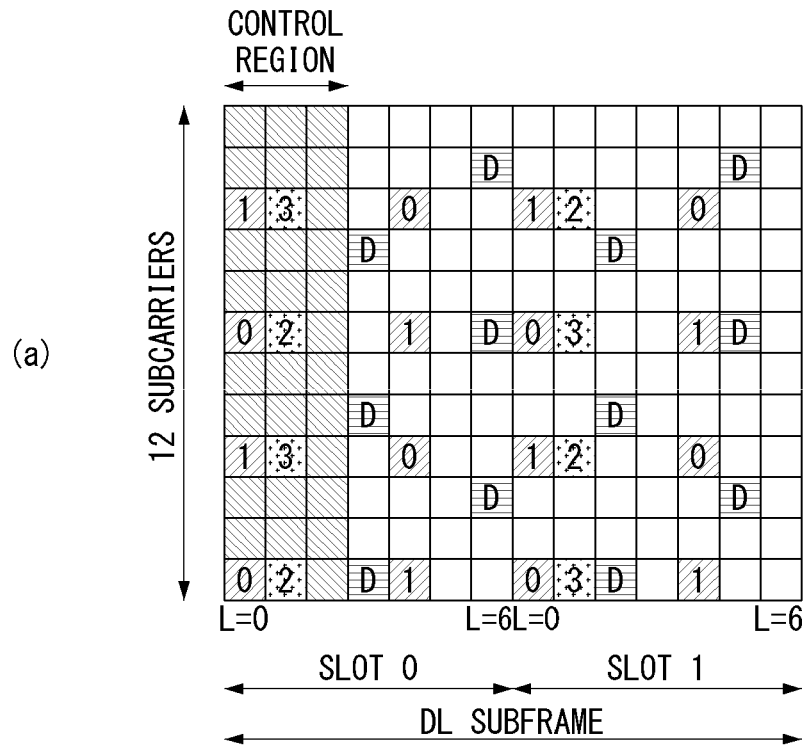
(b)
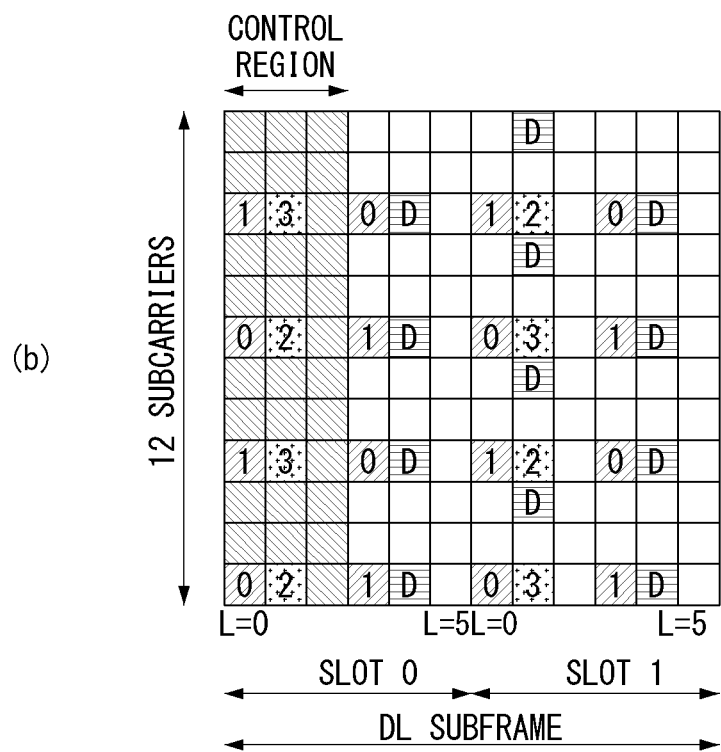

[FIG. 8]
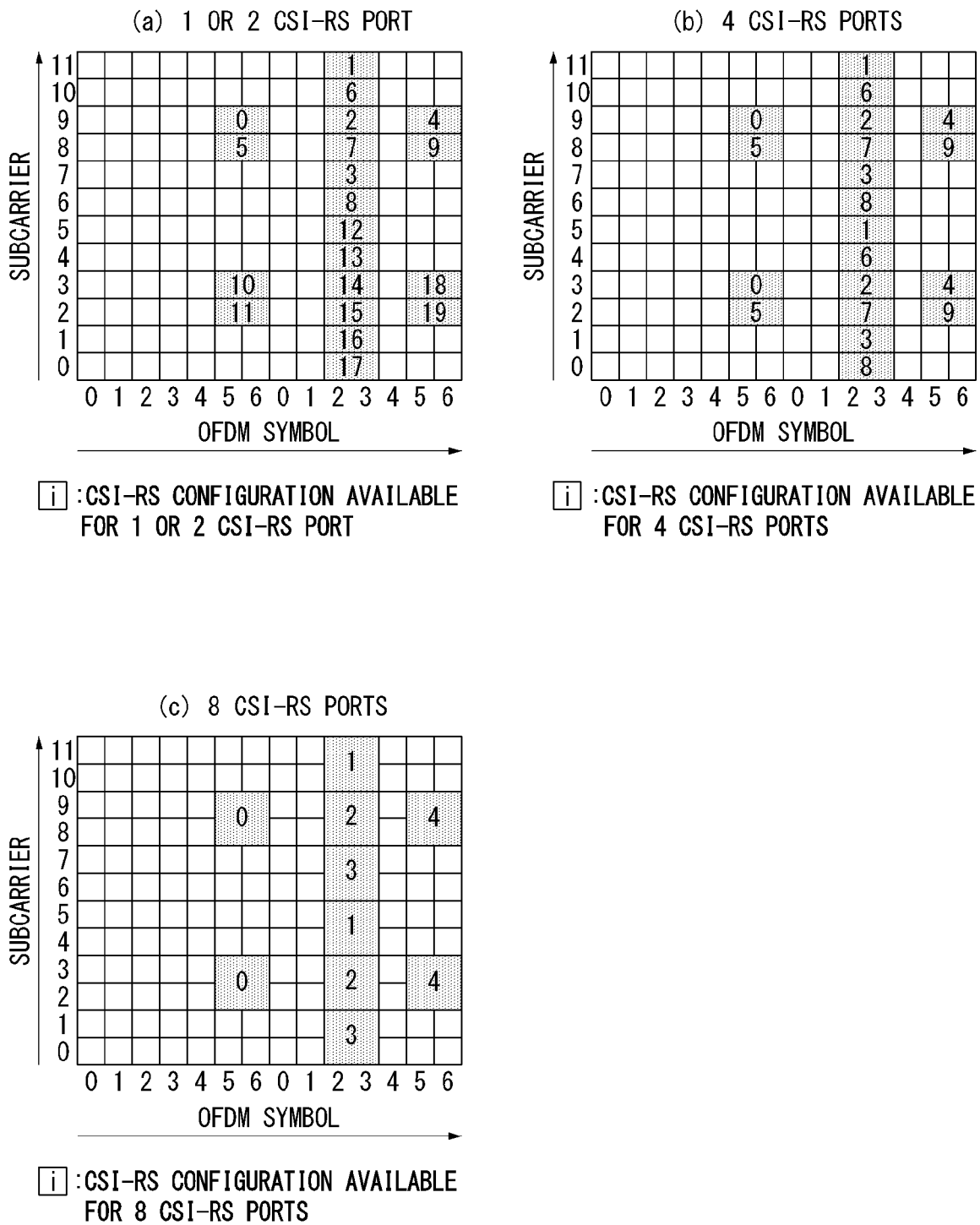

[FIG. 9]
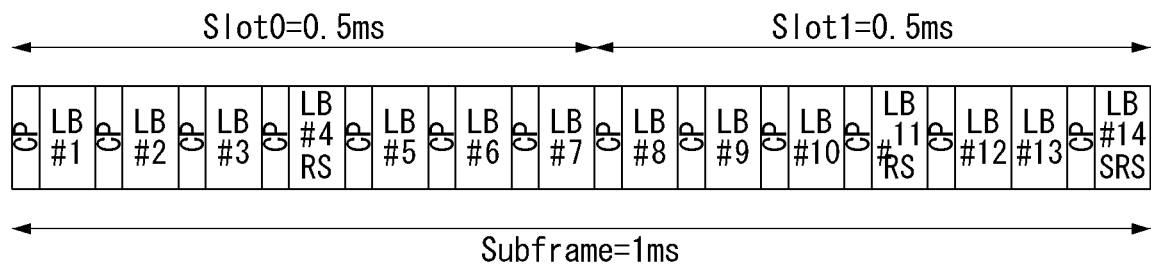
[FIG. 10]
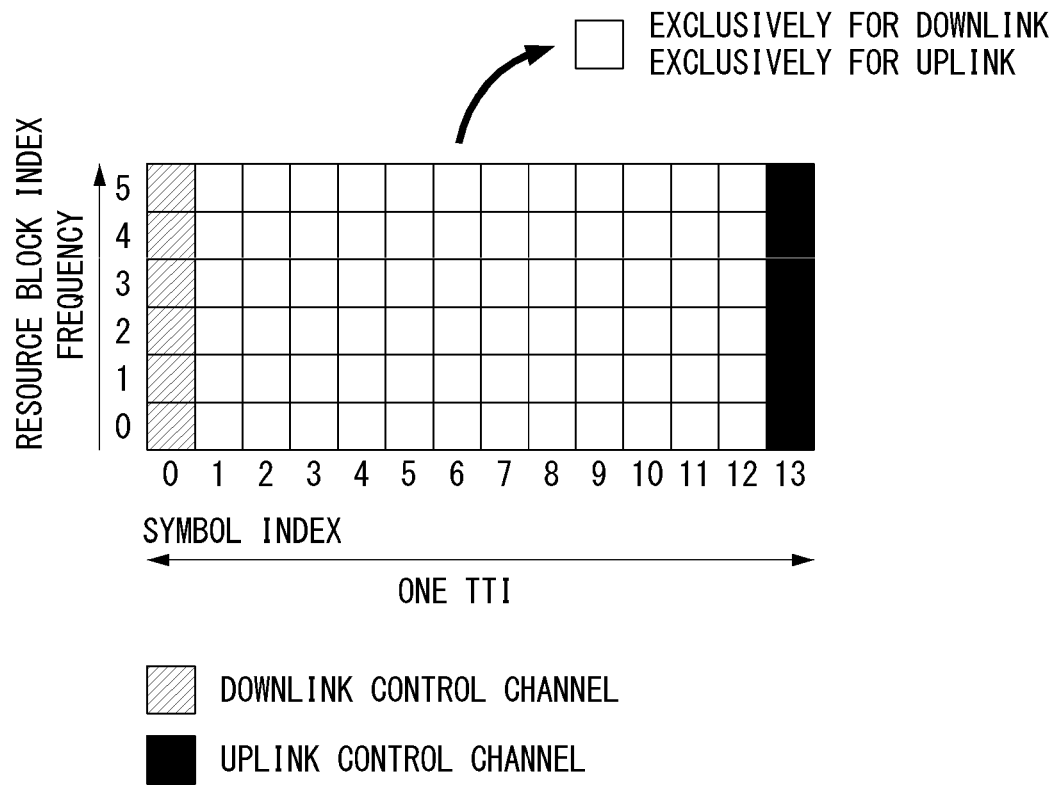

【FIG. 11】
(a)
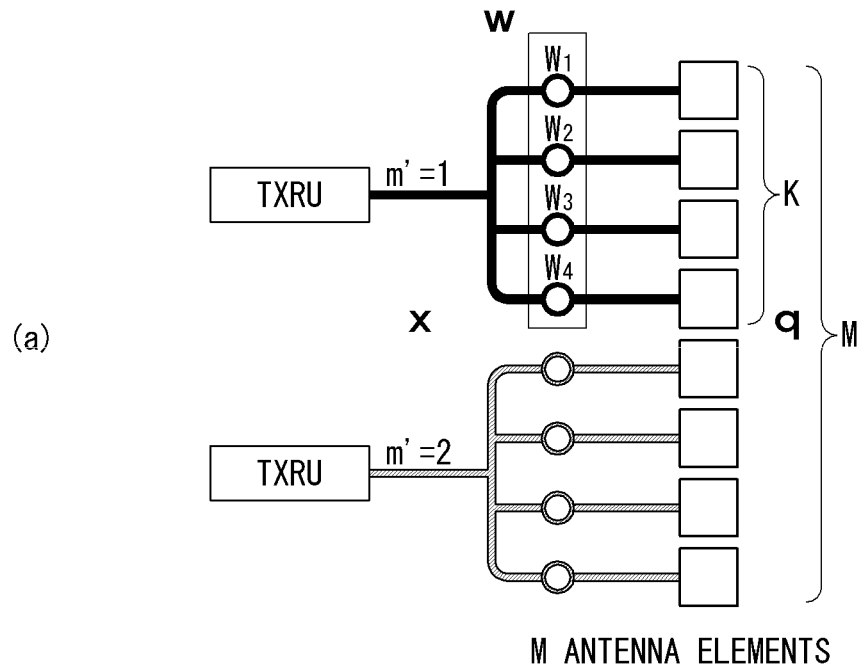
M ANTENNA ELEMENTS
(b)
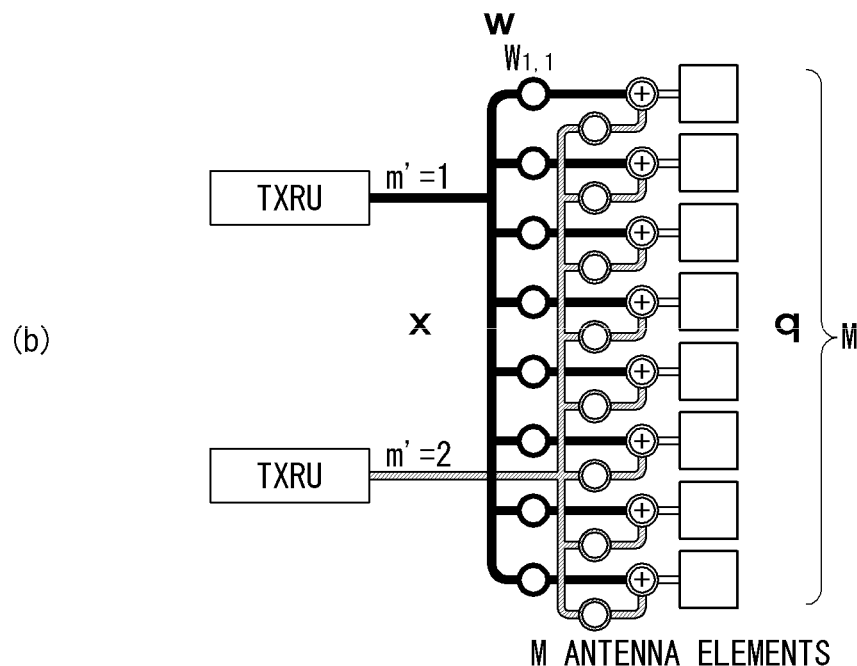
M ANTENNA ELEMENTS

[FIG. 12]
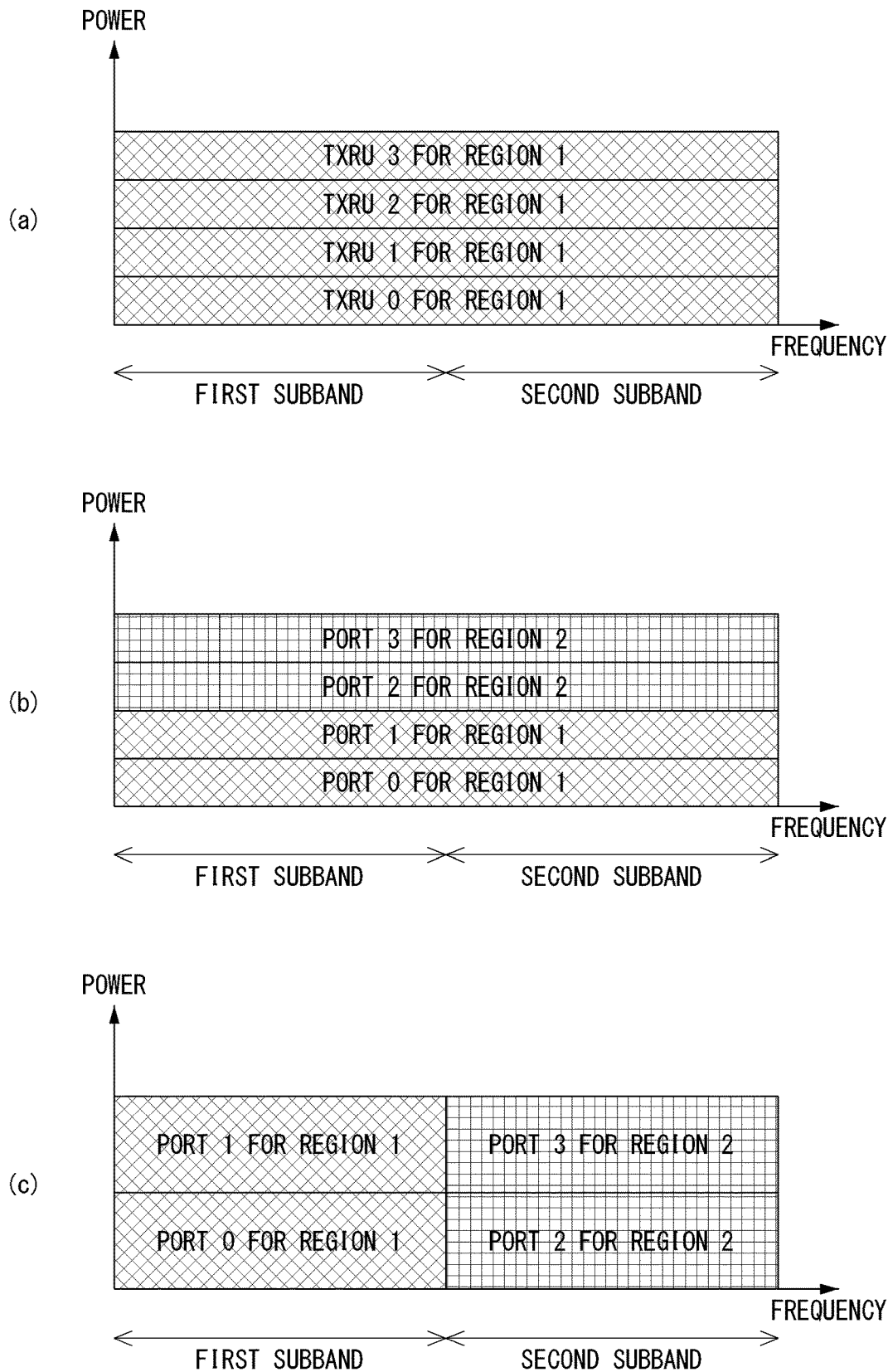

[FIG. 13]
(a)
(b)

[FIG. 14]
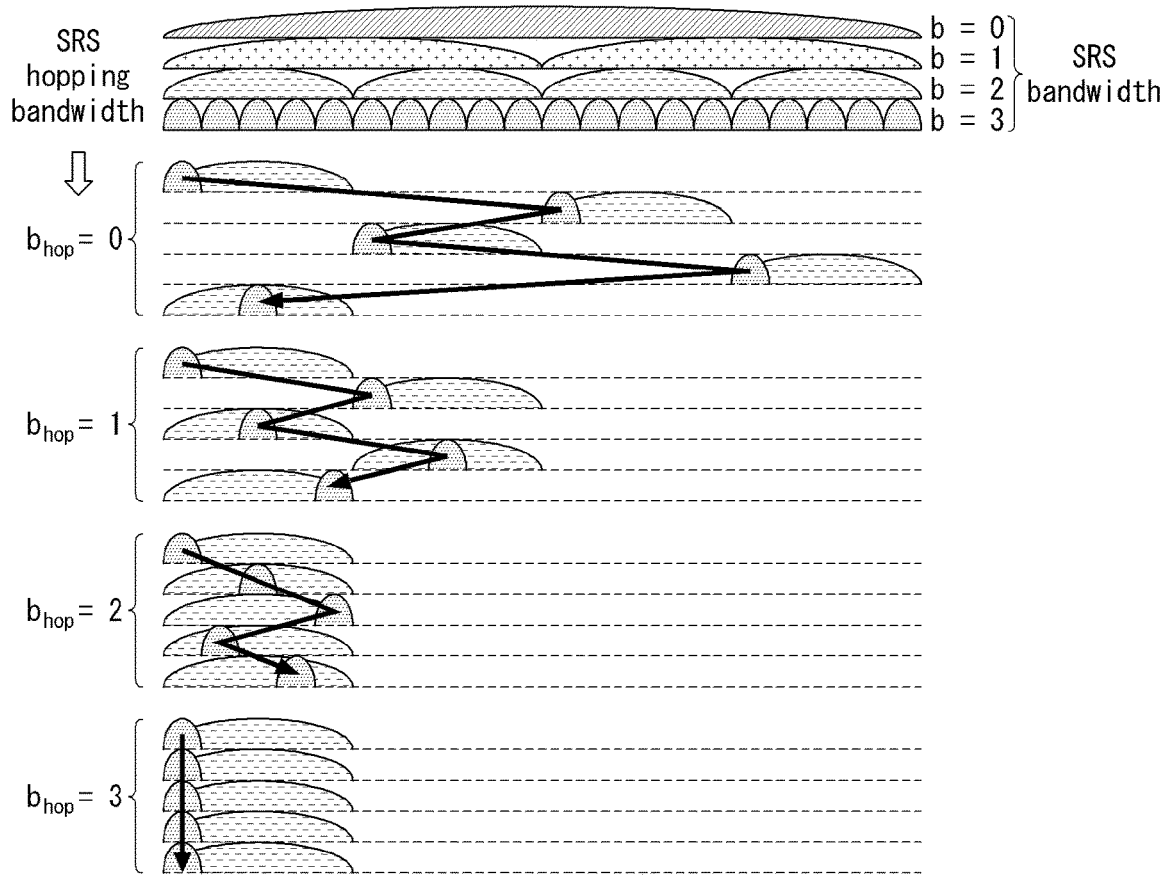
[FIG. 15]
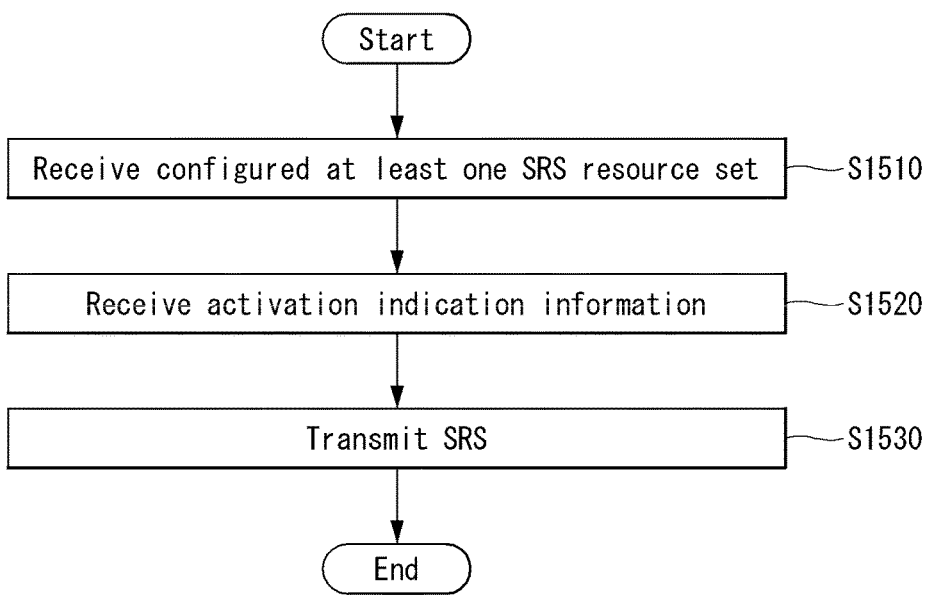

[FIG. 16]
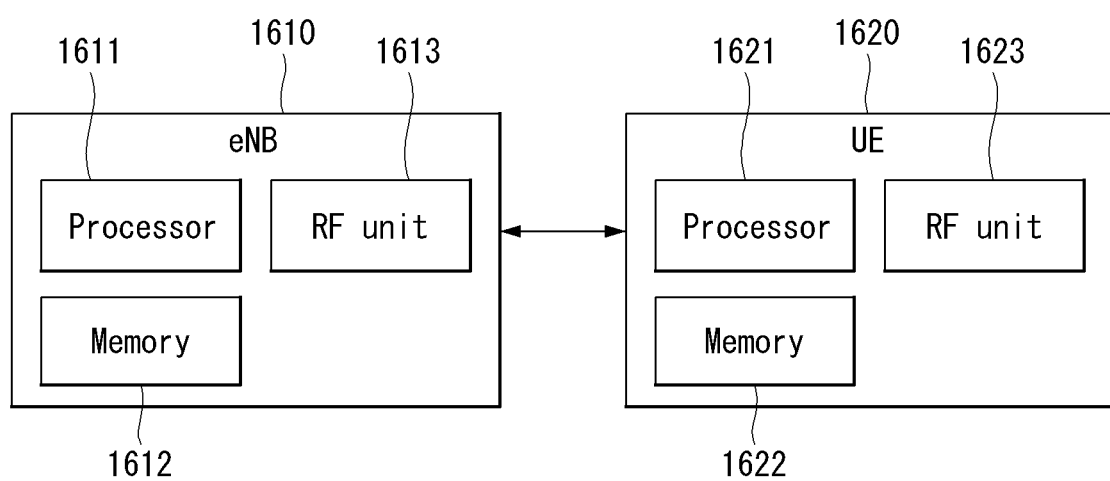

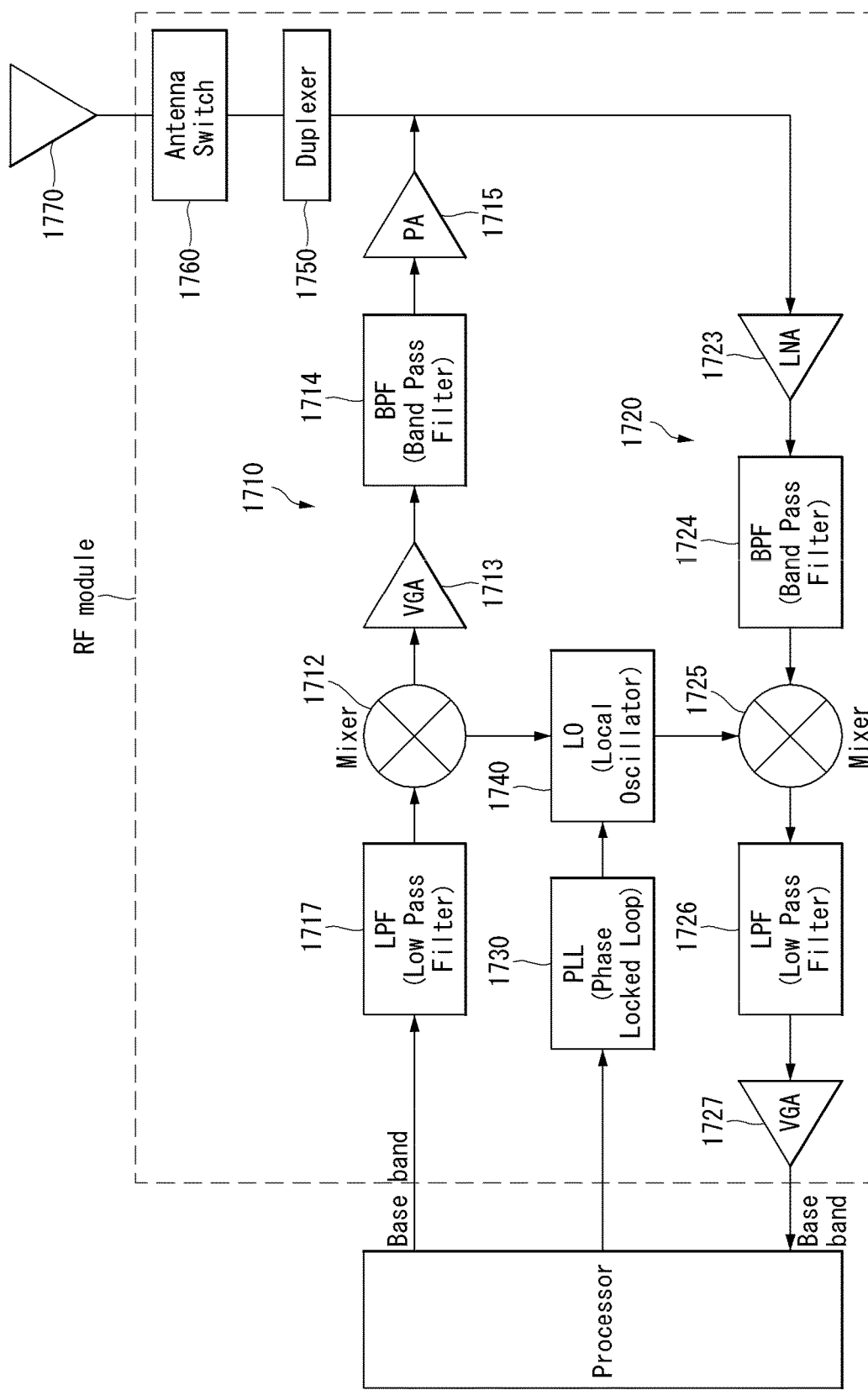
[FIG. 17]

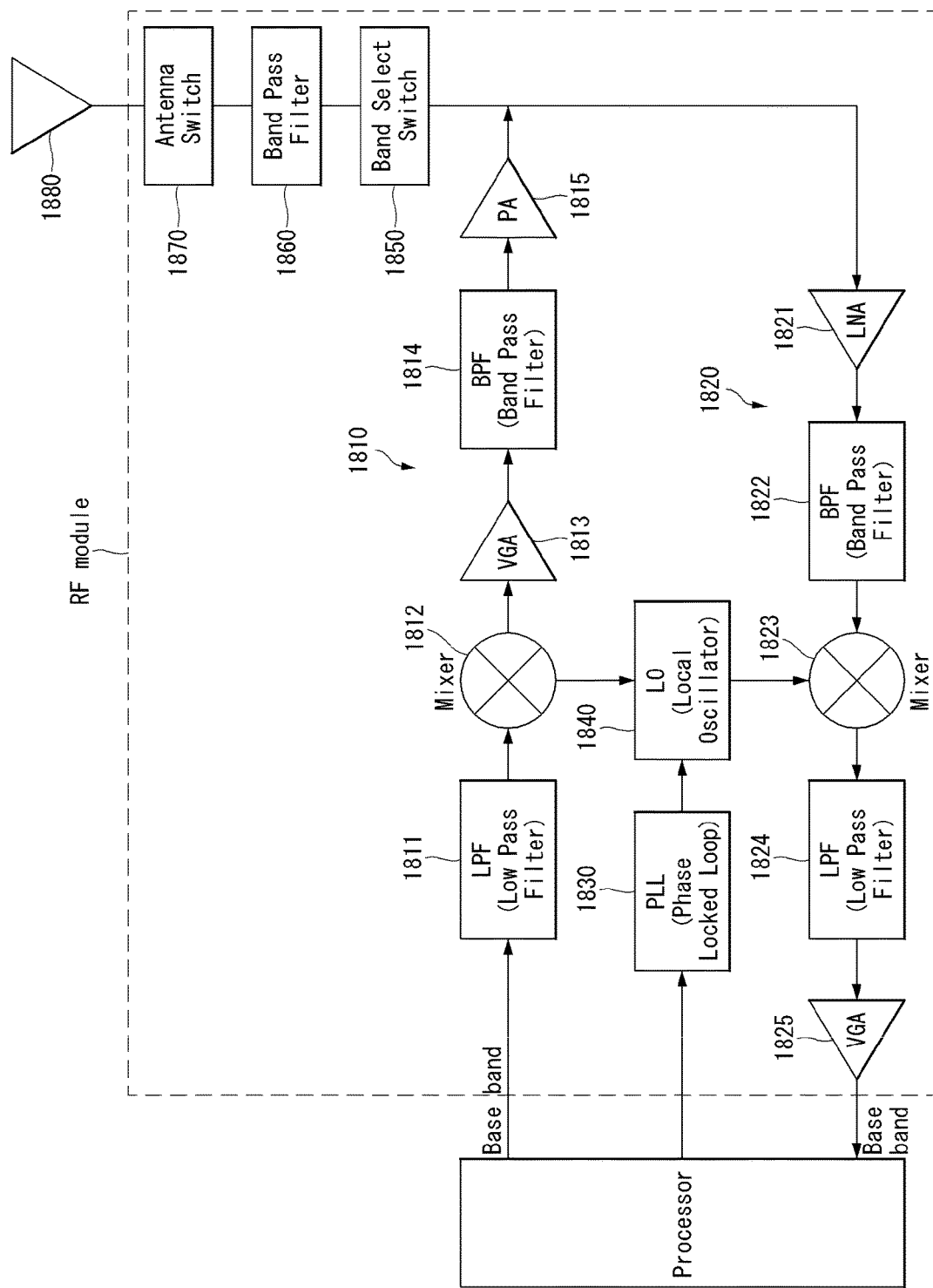
[FIG. 18]

METHOD OF SOUNDING A TERMINAL IN A WIRELESS COMMUNICATION SYSTEM AND APPARATUS THEREFOR

CROSS-REFERENCE TO RELATED APPLICATIONS

This application is a continuation of U.S. application Ser. No. 16/064,345, filed on Jun. 20, 2018, which is a National Stage application under 35 U.S.C. § 371 of International Application No. PCT/KR2018/005073, filed on May 2, 2018, which claims the benefit of U.S. Provisional Application No. 62/504,551, filed on May 11, 2017, and U.S. Provisional Application No. 62/492,938, filed on May 1, 2017. The disclosures of the prior applications are incorporated by reference in their entirety.

TECHNICAL FIELD

The present invention relates to a wireless communication system and, more particularly, to a sounding method of a user equipment and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to effectively support uplink/downlink multi input multi output (MIMO) transmission.

Furthermore, an object of the present invention is to propose an efficient sounding method/procedure of a user equipment.

Technical objects to be achieved in the present are not limited to the above-described technical objects, and other technical objects not described above may be evidently understood by a person having ordinary skill in the art to which the present invention pertains from the following description.

Technical Solution

In an aspect of the present invention, a method for sounding of a user equipment (UE) in a wireless communication system includes receiving, from a base station, a configuration for at least one sounding reference signal (SRS) resource set, receiving, from the base station, activation indication information indicating an SRS transmission activation of a specific SRS resource set among the at least one SRS resource set, and performing SRS transmission, corresponding to the specific SRS resource set, to the base station, wherein a target reference signal to which a spatial relationship assumption is applied for each SRS resource included in the specific SRS resource set may be determined based on the activation indication information.

Furthermore, the at least one SRS resource set may be configured through radio resource control (RRC) signaling.

Furthermore, the type of target reference signal may include an SRS, a channel state information (CSI)-reference signal (RS) and/or a synchronization signal (SS) block.

Furthermore, the type of at least one SRS resource included in the specific SRS resource set may be configured in a semi-persistent type.

Furthermore, the target reference signal of the at least one SRS resource configured with the semi-persistent type may be explicitly indicated by the activation indication information.

Furthermore, the activation indication may be received through medium access control (MAC) control element (CE) signaling.

Furthermore, the type of at least one SRS resource included in the specific SRS resource set may be configured in an aperiodic type.

Furthermore, the activation indication may be received through downlink control information (DCI) signaling.

Furthermore, the target reference signal may be determined as a reference signal configured with respect to the at least one SRS resource configured in the aperiodic type.

Furthermore, the reference signal configured for the at least one SRS resource may correspond to a reference signal in which the spatial relationship assumption has been configured with respect to each of the at least one SRS resource through the RRC signaling.

Furthermore, slot offset information where the SRS transmission of the specific SRS resource set configured in the aperiodic type is initiated may be indicated.

Furthermore, the method may further include receiving an SRS resource indicator (SRI) indicating a specific SRS resource for uplink transmission of the user equipment.

Furthermore, the SRI may be associated with the most recent SRS transmission among SRS transmissions for an SRS resource identified by the SRI.

Furthermore, an orthogonal frequency division multiple (OFDM) symbol location may be indicated for each SRS resource included in the specific SRS resource set.

Furthermore, in another aspect of the present invention, a user equipment (UE) performing uplink transmission in a wireless communication system includes a radio frequency (RF) unit for transmitting and receiving radio signal and a processor controlling the RF unit. The processor is configured to receive, from a base station, a configuration for at least one sounding reference signal (SRS) resource set, receive, from the base station, activation indication information indicating an SRS transmission activation of a specific SRS resource set among the at least one SRS resource set, and perform SRS transmission, corresponding to the specific SRS resource set, to the base station. A target reference signal to which a spatial relationship assumption is applied for each SRS resource included in the specific SRS resource set may be determined based on the activation indication information.

Advantageous Effects

In accordance with an embodiment of the present invention, the sounding procedure of a user equipment can be more efficiently performed/applied/supported.

Furthermore, in accordance with an embodiment of the present invention, an SRS resource for the sounding procedure of a user equipment can be may be configured/supported/signaled clearly and efficiently.

Furthermore, in accordance with an embodiment of the present invention, the transmission of a proper SRS resource in which an aperiodic/semi-persistent SRS transmission type has been taken into consideration can be supported/configured.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 illustrates an uplink subframe including a sounding reference signal symbol in a wireless communication system to which the present invention may be applied.

FIG. 10 is a diagram illustrating a self-contained subframe structure in the wireless communication system to which the present invention may be applied.

FIG. 11 illustrates a transceiver unit model in the wireless communication system to which the present invention may be applied.

FIG. 12 is a diagram illustrating a service area for each transceiver unit in the wireless communication system to which the present invention may be applied.

FIG. 13 is a diagram illustrating an LTE SRS hopping pattern where $n_s=1 \rightarrow n_s=4$ according to an embodiment of the present invention.

FIG. 14 is a diagram illustrating an SRS hopping pattern according to an embodiment of the present invention.

FIG. 15 is a flowchart illustrating an SRS transmission method of a UE according to an embodiment of the present invention.

FIG. 16 illustrates a block diagram of a wireless communication apparatus according to an embodiment of the present invention.

FIG. 17 is a diagram showing an example of the RF module of a wireless communication apparatus to which a method proposed in this specification may be applied.

FIG. 18 is a diagram showing another example of the RF module of a wireless communication apparatus to which a method proposed in this specification may be applied.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A or new RAT (RAT in 5G (5 generation) system) is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of T_s=1/(15000*2048). A UL and DL transmission includes the radio frame having a duration of T_f=307200*T_s=10 ms.

FIG. 1(a) exemplifies a radio frame structure type 1. The type 1 radio frame may be applied to both of full duplex FDD and half duplex FDD.

A radio frame includes 10 subframes. A radio frame includes 20 slots of T_slot=15360*T_s=0.5 ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N_{ADL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad [\text{Equation 1}]$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad [\text{Equation 2}]$$

Meanwhile, transmission power may be different in each of pieces of transmission information s_1, s_2, ..., s_NT. In this case, if pieces of transmission power are P_1, P_2, P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad [\text{Equation 3}]$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

[Equation 5]
$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

[Equation 10]
$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0 ~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f=15$ kHz.

In a subframe configured for CSI-RS transmission, a CSI-RS sequence is mapped to a complex-valued modulation symbol $a\_k,l^{\hat{}}(p)$ used as a reference symbol on each antenna port p as in Equation 12.

[Equation 12]

$$a_{k,l}^{(p)} = w_{l''} \cdot r_{l,n_s}(m')$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1−1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1−1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") $T\_CSI\text{-}RS$ and a subframe offset $\Delta\_CSI\text{-}RS$ for CSI-RS transmission are shown in Table 5.

Table 5 illustrates CSI-RS subframe configurations.

TABLE 5

| CSI-RS-SubframeConfig $I_{CSI-RA}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, the CSI-RS transmission period $T\_CSI\text{-}RS$ and the subframe offset $\Delta\_CSI\text{-}RS$ are determined depending on the CSI-RS subframe configuration $I\_CSI\text{-}RS$.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI\text{-}RS}) \bmod T_{CSI\text{-}RS} = 0 \quad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is ρ_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Sounding Reference Signal (SRS)

An SRS is mainly used for channel quality measurement to perform uplink frequency-selective scheduling and is not related to transmission of uplink data and/or control information. However, the present invention is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

FIG. 9 illustrates an uplink subframe including a sounding reference signal symbol in a wireless communication system to which the present invention may be applied.

Referring to FIG. 9, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

As more and more communication devices require larger communication capacity, there is a need for improved mobile broadband communication compared to the existing radio access technology (RAT). Massive machine type communications (MTCs), which provide various services anytime and anywhere by connecting many devices and objects, are one of the major issues to be considered in the next generation communication. In addition, a communication system design considering a service/UE sensitive to reliability and latency is being discussed.

The introduction of next generation radio access technology considering enhanced mobile broadband communication, massive MTC, ultra-reliable and low latency communication (URLLC) is discussed, and in the present invention, the technology is called new RAT for convenience.

Self-Contained Subframe Structure

FIG. 10 is a diagram illustrating a self-contained subframe structure in the wireless communication system to which the present invention may be applied.

In a TDD system, in order to minimize the latency of data transmission, a 5 generation (5G) new RAT considers a self-contained subframe structure as shown in FIG. 10.

In FIG. 10, a dashed area (symbol index of 0) indicates a downlink (DL) control area and a black area (symbol index of 13) indicates an uplink (UL) control area. An unmarked area may also be used for DL data transmission or for UL data transmission. Such a structure is characterized in that DL transmission and UL transmission are sequentially performed in one subframe, and DL data is transmitted in a subframe, and UL ACK/NACK may also be received. As a result, it takes less time to retransmit data when a data transmission error occurs, thereby minimizing the latency of final data transmission.

In such a self-contained subframe structure, there is a need for a time gap between the base station and the UE for the conversion process from the transmission mode to the reception mode or from the reception mode to the transmission mode. For this end, some OFDM symbols at the time of switching from DL to UL in the self-contained subframe structure are configured to a guard period (GP).

Analog Beamforming

In a millimeter wave (mmW), a wavelength is shortened, so that a plurality of antenna elements may be installed in the same area. That is, a total of 64 (8×8) antenna elements may be installed in a 2-dimension array at a 0.5 lambda (that is, wavelength) interval on a panel of 4×4 (4 by 4) cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem that effectiveness is deteriorated in terms of costs. Therefore, a method of mapping a plurality of antenna elements to one TXRU and adjusting a direction of a beam using an analog phase shifter is considered. Such an analog BF method has a disadvantage in that frequency selective BF may not be performed by making only one beam direction in all bands.

A hybrid BF with B TXRUs, which is an intermediate form of digital BF and analog BF, and fewer than Q antenna elements, may be considered. In this case, although there is a difference depending on a connection method of B TXRUs and Q antenna elements, the number of directions of the beams that may be transmitted at the same time is limited to B or less.

Hereinafter, representative examples of a method of connection method of TXRUs and antenna elements will be described with reference to the accompanying drawing.

FIG. 11 shows a transceiver unit model in a radio communication system to which the present invention may be applied.

A TXRU virtualization model shows a relationship between an output signal of the TXRUs and an output signal of the antenna elements. According to the correlation between the antenna element and the TXRU, The TXRU virtualization model may be divided into TXRU virtualization model option-1 and a sub-array partition model as illustrated in FIG. 11(a) and TXRU virtualization model option-2 and a full-connection model as illustrated in FIG. 11 (b).

Referring to FIG. 11(a), in the case of the sub-array partition model, the antenna element is divided into multiple antenna element groups and each TXRU is connected to one of the groups. In this case, the antenna element is connected to only one TXRU.

Referring to FIG. 11(b), in the case of the full-connection model, signals of multiple TXRUs are combined and transmitted to a single antenna element (or an array of antenna elements). That is, a scheme is illustrated, in which the TXRU is connected to all antenna elements. In this case, the antenna element is connected to all TXRUs.

In FIG. 11, q represents a transmission signal vector of antenna elements having M co-polarized waves in one column. w represents a wideband TXRU virtualization weight vector and W represents a phase vector multiplied by an analog phase shifter. In other words, the direction of analog beamforming is determined by W. x represents a signal vector of M_TXRU TXRUs.

Herein, mapping of the antenna ports and the TXRUs may be 1-to-1 or 1-to-many.

In FIG. 11, the mapping (TXRU-to-element mapping) between the TXRU and the antenna element is merely an example, and the present invention is not limited thereto. The present invention may be similarly applied even to mapping between the TXRU and the antenna element, which may be implemented in various other forms in terms of hardware.

Feedback of Channel State Information (CSI)

In a 3GPP LTE/LTE-A system, user equipment (UE) is defined to report channel state information (CSI) to a base station (BS or eNB).

The CSI collectively refers to information that may indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Reference Signal (RS) virtualization

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission may be simultaneously performed to a plurality of UEs in several analog beam directions.

FIG. 12 is a diagram illustrating a service area for each transceiver unit in the wireless communication system to which the present invention may be applied.

In FIG. 12, 256 antenna elements are divided into 4 parts to form a 4 sub-arrays, and the structure of connecting the TXRU to the sub-array will be described as an example as shown in FIG. 11 above.

When each sub-array is constituted by a total of 64 (8×8) antenna elements in the form of a 2-dimensional array, specific analog beamforming may cover an area corresponding to a 15-degree horizontal angle area and a 15-degree vertical angle area. That is, the zone where the BS should be served is divided into a plurality of areas, and services are provided one by one at a time.

In the following description, it is assumed that the CSI-RS antenna ports and the TXRUs are 1-to-1 mapped. Therefore, the antenna port and the TXRU have the same meaning as the following description.

As shown in FIG. 12(a), if all TXRUs (antenna ports, sub-arrays) (that is, TXRU 0, 1, 2, 3) have the same analog beamforming direction (that is, region 1), the throughput of the corresponding zone may be increased by forming digital beam with higher resolution. Also, it is possible to increase the throughput of the corresponding zone by increasing the rank of the transmission data to the corresponding zone.

As shown in FIGS. 12(b) and 12(c), if each TXRU (antenna port, sub-array) (that is, TXRU 0, 1, 2, 3) has a different analog beamforming direction (that is, region 1 or region 2, the data may be transmitted simultaneously to UEs distributed in a wider area in the subframe (SF).

As an example shown in FIGS. 12(b) and 12(c), two of the four antenna ports are used for PDSCH transmission to UE1 in region 1 and the remaining two antenna ports are used for PDSCH transmission to UE2 in region 2.

Particularly, in FIG. 12(b), PDSCH1 transmitted to UE1 and PDSCH2 transmitted to UE2 represent examples of spatial division multiplexing (SDM). Unlike this, as shown in FIG. 12(c), PDSCH1 transmitted to UE1 and PDSCH2 transmitted to UE2 may also be transmitted by frequency division multiplexing (FDM).

Among a scheme of serving one area using all the antenna ports and a scheme of serving many areas at the same time by dividing the antenna ports, a preferred scheme is changed according to the rank and the modulation and coding scheme (MCS) servicing to the UE for maximizing the cell throughput. Also, the preferred method is changed according to the amount of data to be transmitted to each UE.

The BS calculates a cell throughput or scheduling metric which may be obtained when one area is served using all the antenna ports, and calculates the cell throughput or scheduling metric which may be obtained when two areas are served by dividing the antenna ports. The BS compares the cell throughput or the scheduling metric which may be obtained by each scheme to select the final transmission scheme. As a result, the number of antenna ports participating in PDSCH transmission is changed by SF-by-SF. In order for the BS to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports ($p=\{0, 1, \ldots, 7\}$).

The reference-signal sequence '$r\_l(m)$' may be defined by Equation 14 below.

$$r_l(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 8 \cdot (N_{RB}^{max,DL} - 18) - 1$$
[Equation 14]

Where $l=0, 1, \ldots, 13$ is the OFDM symbol number. $N\_RB\hat{}max,DL$ represents the largest downlink band configuration and $N\_sc\hat{}RB$ is expressed by a multiple. $N\_sc\hat{}RB$ represents the size of the resource block in the frequency domain and is expressed by the number of sub-carriers.

In Equation 14, c(i) may be predefined as a pseudo-random sequence. The pseudo-random sequence generator may be initialized at the start of each OFDM symbol by using Equation 15 below.

$$C_{init}=2^{10} \cdot (7 \cdot (n_s+1)+l'+1) \cdot (2 \cdot N_{ID}^{cell}+1)+2 \cdot N_{ID}^{cell}+1$$
[Equation 15]

Where N_ID^cell represents a physical layer cell identifier. n_s=floor(l/7) and floor(x) represents a floor function for deriving a maximum integer of x or less. l'=l mod 7 and mod represents a modulo operation.

Beam Refinement Reference Signal (BRRS)

Beam refinement reference signals (BRRSs) may be transmitted on up to eight antenna ports ($p=600, \ldots, 607$). The transmission and reception of the BRRS are dynamically scheduled in the downlink resource allocation on xPDCCH.

The reference-signal sequence '$r\_l,ns(m)$' may be defined by Equation 16 below.

$$r_{l,n_s}(m) = \frac{1}{\sqrt{2}}(1 - 2c(2m)) + j\frac{1}{\sqrt{2}}(1 - 2c(2m+1)),$$
$$m = 0, 1, \ldots, \left\lfloor \frac{3}{8}N_{RB}^{max,DL} \right\rfloor - 1$$
[Equation 16]

Where n_s represents the slot number in the radio frame. l represents the OFDM symbol number in the slot. c(i) may be predefined as the pseudo-random sequence. The pseudo-random sequence generator may be initialized at the start of each OFDM symbol by using Equation 17 below.

$$c_{init}=2^{10}(7(\bar{n}_s+1)+l+1)(2N_{ID}^{BRRS}+1)+2N_{ID}^{BRRS}+1$$

$$\bar{n}_s = n_s \bmod 20$$
[Equation 17]

Herein, N_ID^BRRS is configured to the UE through the RRC (Radio Resource Control) signaling.

DL Phase Noise Compensation Reference Signal

Phase noise compensation reference signals associated with xPDSCH may be transmitted on antenna port(s) p=60 and/or p=61 according to the signaling in the DCI. Further, the phase noise compensation reference signals associated with xPDSCH may be present as a valid reference for phase noise compensation only if the xPDSCH transmission is associated with the corresponding antenna port. In addition, the phase noise compensation reference signals associated with xPDSCH may be transmitted only on the physical resource blocks and symbols upon which the corresponding xPDSCH is mapped. Moreover, the phase noise compensation reference signals associated with xPDSCH may be identical in all symbols with xPDSCH allocation.

For any antenna port $p \in \{60, 61\}$, the reference-signal sequence '$r(m)$' is defined by Equation 18 below.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, \lfloor N_{RB}^{max,DL}/4 \rfloor - 1$$
[Equation 18]

Herein, c(i) may be predefined as the pseudo-random sequence. The pseudo-random sequence generator may be initialized at the start of each subframe by using Equation 19 below.

$$c_{init}=(\lfloor n_s/2 \rfloor+1) \cdot (2n_{ID}^{(nSCID)}+1) \cdot 2^{16}+n_{SCID}$$
[Equation 19]

Where n_SCID is 0 if unless specified otherwise. In the xPDSCH transmission, n_SCID is given in a DCI format associated with the xPDSCH transmission.

n_ID^(i) (where i=0, 1) is given as follows. When the value of n_ID^PCRS,i is not provided by the higher layer, n_ID^(i) is equal to N_ID^cell. If not, n_ID^(i) is equal to n_ID^PCRS,i.

Quasi Co-Located (QCL) Between Antenna Ports

In the present invention, when a UE receives data (e.g., PDSCH), the UE takes into consideration a method of demodulating the data into a UE-specific RS, such as a specific DMRS. Such a DMRS is transmitted only along with the scheduled RB(s) of the corresponding PDSCH and is transmitted during a time interval in which the scheduled PDSCH is transmitted. Accordingly, there are restrictions to reception performance in performing channel estimation using only the corresponding DMRS itself. For example, in performing channel estimation, there is a need for the estimation value of major large-scale parameter/properties (LSP) of a radio channel and DMRS density may be insufficient to obtain the estimation value using only a DMRS present in the time/freq domain in which the scheduled PDSCH is transmitted. Accordingly, in order to support an implementation of such a UE, the LTE-A standard supports methods capable of defining quasi co-location signaling/assumption/behavior between the following RS ports and thus configuring/operating the UE.

Quasi co-located or quasi co-location (QC/QCL) may be defined as follows.

If two antenna ports have a QC/QCL relation (or have been QC/QCLed), a UE may assume that the large-scale property of a signal delivered through one antenna port may be inferred from a signal delivered through the other antenna port. In this case, the large-scale property includes one or more of delay spread, Doppler spread, a frequency shift, average received power, and received timing.

Furthermore, the large-scale property may be defined as follows. If two antenna ports have a QC/QCL relation (or have been QC/QCLed), a UE may assume that the large-scale property of a channel in which one symbol is delivered through one antenna port may be inferred from a radio channel in which one symbol is delivered through the other antenna port. In this case, the large-scale property includes one or more of delay spread, Doppler spread, a Doppler shift, an average gain and average delay.

That is, if two antenna ports have a QC/QCL relation (or they have been QC/QCLed), this means that the large-scale property of a radio channel from one antenna port is the same as the large-scale property of a radio channel from the other antenna port. Assuming that a plurality of antenna ports in which an RS is transmitted is taken into consideration, if antenna ports in which different two types of RSs are transmitted have a QCL relation, the large-scale property of a radio channel from one type of antenna port may be substituted with the large-scale property of a radio channel from the other type of antenna port.

In this specification, the above QC/QCL-related definitions are not distinguished. That is, the QC/QCL concept may follow one of the above definitions. Alternatively, as another similar form, the QC/QCL concept definition may be modified in a form as if antenna ports in which QC/QCL assumption is established are transmitted at a co-location (e.g., a UE may assume the antenna ports transmitted as the same transmission point). The spirit of the present invention includes such similar modified examples. In the present invention, for convenience of description, the above QC/QCL-related definitions may be interchangeably used.

According to the concept of QC/QCL, a UE cannot assume the same large-scale property between radio channels from corresponding antenna ports with respect to non-QC/QCL antenna ports. That is, in this case, the UE must perform independent processing on timing acquisition and tracking, frequency offset estimation and compensation, latency estimation, and Doppler estimation for each configured non-QC/QCL antenna port.

There is an advantage in that a UE can perform the following operation between antenna ports capable of assuming QC/QCL:

With respect to Delay spread and Doppler spread, a UE may identically apply power-delay profile, delay spread and Doppler spectrum, and Doppler spread estimation results for a radio channel from any one antenna port to a Wiener filter, used upon channel estimation for a radio channel from another antenna port.

With respect to a frequency shift and received timing, a UE may perform time and frequency synchronization on any one antenna port, and may apply the same synchronization to the demodulation of another antenna port.

With respect to average received power, a UE may average reference signal received power (RSRP) measurement for two antenna ports or more.

For example, if a DMRS antenna port for downlink data channel demodulation has been QC/QCLed with the CRS antenna port of a serving cell, a UE may identically apply the large-scale properties of a radio channel, estimated from its own CRS antenna port, when performing channel estimation through the corresponding DMRS antenna port, thereby being capable of enhancing DMRS-based downlink data channel reception performance.

The reason for this is that estimates for a large-scale property can be stably obtained from a CRS because the CRS is a reference signal broadcast with relatively high density every subframe and a full band. In contrast, a DMRS is transmitted in a UE-specific manner with respect to a specific scheduled RB. Furthermore, since a precoding matrix used by a base station for transmission may vary, a valid channel received by a UE may vary in a precoding resource block group (PRG) unit. Accordingly, if a DMRS is used for the large-scale property estimation of a radio channel although multiple PRGs have been scheduled, performance deterioration may occur when the multiple PRGs are used in a wide band. Furthermore, the transmission period of a CSI-RS may be several ~ several tens of ms, and each resource block has low density of 1 resource element per antenna port on average. Accordingly, likewise, if a CSI-RS is used for the large-scale property estimation of a radio channel, performance deterioration may occur.

That is, a UE may perform QC/QCL assumption between antenna ports and use it for the detection/reception of a downlink reference signal, channel estimation, channel state reporting, etc.

Meanwhile, a UE may assume that antenna ports 0-3 for a serving cell and an antenna port for a PSS/SSS have a QCL relation with a Doppler shift and average delay.

UL MIMO in NR

The following techniques are discussed for new RAT (NR) uplink (UL) multi-input multi-output (MIMO).

i) Uplink transmission/reception schemes for data channels

Non reciprocity based UL MIMO (e.g., PMI based)

Reciprocity based UL MIMO (e.g., UE derives precoder based on downlink RS measurement (including partial reciprocity)

Support of multi user (MU)-MIMO
Open-loop/Close-loop single/Multi point spatial multiplexing (SM)
For example, for multi point SM, multi layers are received either jointly or independently by different transmit reception points (TRPs).
For multi point SM, multiple points may be coordinated.
Single/Multi panel spatial diversity
Uplink antenna/panel switching (UE side)
UL beamforming management for analog implementation
Combination of the above techniques ii) UL RS design considering the below functions
Sounding
Demodulation
Phase noise compensation
iii) UL transmit power/timing advance control in the context of UL MIMO
iv) Transmission scheme(s) for carrying UL control information
v) Other UL MIMO and related techniques are not limited.

The following aspects for UL MIMO transmission should be supported:
i) Transmission schemes/methods for reciprocity calibrated UEs, reciprocity non-calibrated UEs, and non-reciprocity/partial reciprocity cases
If needed, signaling associated with UL reciprocity based operation is introduced. For example, UE capability which indicates calibration accuracy
Whether to differentiate reciprocity non-calibrated UEs from non-reciprocity or not is to be discussed.
The number of transmission schemes/methods may be further discussed.
ii) At least one of the following candidate schemes/methods is to be supported.
Candidate 1: Codebook Based Transmission
Frequency selective and frequency non-selective precoding in digital domain may be considered for a wide system bandwidth. The support for the frequency selective precoding is determined according to decision on NR waveform(s). The value of the wide system bandwidth will be discussed later.
For example, base station (BS)-based which is analogous to the LTE
For example, UE-aided and BS-centric mechanism: The UE recommends candidate UL precoders from a predefined codebook to BS based on DL RS measurement. In addition, the BS determines the final precoder taken from the codebook.
For example, UE-centric and BS-aided mechanism: The BS provides CSI (e.g. channel response, interference-related information) to the UE. In addition, the UE determines the final precoder based on the information from the BS.
Candidate 1: Non-Codebook Based Transmission
Frequency selective and frequency non-selective precoding in digital domain may be considered for the wide system bandwidth. The support for the frequency selective precoding is determined according to decision on NR waveform(s). The value of the wide system bandwidth will be discussed later.
For example, reciprocity based (DL RS based) transmission only for calibrated UEs
For example, UE-aided and BS-centric mechanism: The UE recommends candidate UL precoders to the BS based on DL RS measurement. In addition, the BS determines the final precoder.
For example, UE-centric and BS-aided mechanism: The BS provides CSI (e.g. channel response, interference-related information) to the UE. In addition, the UE determines the final precoder based on the information from the BS.
Other transmission schemes/methods are not limited.
i) Discussion of UL precoder signaling for frequency selective/non-selective precoding Example 1

Signaling of Single or Multiple PMIs Via DL Control and/or Data Channels

Multiple PMIs may be signaled via a single DCI or multi-level DCI ($1^{st}$ level DCI contains a location indication to the $2^{nd}$ level DCI).

Example 2

For TDD, Precoder Calculation at the UE Based on DL RS

The implementation of the frequency selective precoding is determined according to RAN1 decision (e.g. NR frame structure, waveform(s)).
An influence on other system design aspects (e.g. DL control channel decoding performance/complexity) should be considered.
ii) Discussion of the use of UL frequency selective precoding for precoded transmission including precoder cycling
iii) For frequency selective precoding, discussion of UL precoding granularity (i.e. UL subband size) considering following aspects
Implicit (defined by spec.) or explicit (by eNB/UE decision) signaling support
Whether to align with DL
iv) Evaluation should include UL specific aspects such as cubic metric (CM) analysis according to UL waveform, etc.
v) Discussion of frequency non-selective precoding is of higher-priority.
An X-port SRS resource may be configured in a UE. The SRS resource may span over one or several OFDM symbols within a single slot.
All X SRS ports may be sound or not in each OFDM symbol.
For at least CSI acquisition:
A multi-symbol SRS resource may be configured so that X SRS ports are transmitted in different locations of different OFDM symbol bands of a slot according to a frequency hopping method in each OFDM symbol. This permits the sounding a larger part of (or the entire) UE bandwidth using narrower band SRS transmission.
In all OFDM symbols, all X ports are sounded in the same part of a beam.
When a UE RF implementation aspect on the SRS design is taken into consideration, restrictions may be applied to the design of a symbol-wise hopping pattern (e.g., a required time for frequency re-tuning) (if re-tuning is necessary) or a transient period if re-tuning is not necessary)
SRS Transmission Method (UE Sounding Procedure)
A UE needs to transmit an SRS for each serving cell SRS resources based on two trigger types.
Trigger Type 0: higher layer signaling
Trigger Type 1: DCI format is 0/4/1A in the case of FDD and TDD and DCI format is 2B/2C/2D in the case of TDD.

If trigger type 0 and trigger type 1 SRS transmission occur in the same subframe of the same serving cell, a UE needs to transmit only the trigger type 1 SRS transmission.

SRS parameters for the trigger type 0 and the trigger type 1 may be configured in a UE in each serving cell. The following SRS parameters may be configured cell-specifically and semi-persistently in a higher layer with respect to the trigger type 0 and the trigger type 1.

Each configuration of the trigger type 1 and transmission comb $\overline{K}_{TC}$ defined (in TS 36.211) with respect to the trigger type 0

Each configuration of the trigger type 1 and start physical resource block allocation $n_{RRC}$ defined (in TS 36.211) with respect to the trigger type 0

Duration: single or unrestricted (until disabled) defined (in TS 36.211) with respect to the trigger type 0 srs-ConfigIndex ISRS for an SRS period $T_{SRS}$ and SRS subframe offset $T_{offset}$ defined in Table 7 and Table 8 with respect to the trigger type 0 and an SRS period $T_{SRS,1}$ and SRS subframe offset $T_{offset,1}$ defined in Table 10 and Table 11 with respect to the trigger type 1

Each configuration of the trigger type 1 and an SRS bandwidth $B_{SRS}$ defined (in TS 36.211) with respect to the trigger type 0

Frequency hopping bandwidth $b_{hop}$ defined (in TS 36.211) with respect to the trigger type 0

Each configuration of the trigger type 1 and a cyclic shift $n_{SRS}^{cs}$ defined (in TS 36.211) with respect to the trigger type 0

Each configuration of the trigger type 1 and an antenna port number $N_p$ for the trigger type 0

In the case of the trigger type 1 and the DCI format 4, srs-ConfigApDCI-Format4, that is, three sets of SRS parameters, may be configured by higher layer signaling. The 2-bit SRS request field of the DCI format 4 indicates a given SRS parameter set in Table 6. In the case of the trigger type 1 and the DCI format 0, a single set of SRS parameters, srs-ConfigApDCI-Format0 is configured by higher layer signaling. In the case of the trigger type 1 and the DCI formats 1A/2B/2C/2D, a single common set srs-ConfigApDCI-Format1a2b2c for SRS parameters is configured by higher layer signaling. The SRS request field is 1-bit with respect to the DCI formats 0/1A/2B/2C/2D. When a value of the SRS request field is set to "1", a Type 1 SRS is triggered.

Table 6 is a table regarding SRS request values for the trigger type 1 in the DCI format 4.

TABLE 6

| Value of SRS request field | Description |
|---|---|
| "00" | No type 1 SRS trigger |
| "01" | The 1st SRS parameter set configured by higher layers |
| "10" | The 2nd SRS parameter set configured by higher layers |
| "11" | The 3rd SRS parameter set configured by higher layers |

The serving cell-specific SRS transmission bandwidth $C_{SRS}$ is configured by higher layers. An allowable value may be separately defined or may be given in a specific standard document (e.g., TS 36.211).

The serving cell-specific SRS transmission subframe is configured by higher layers. An allowable value may be separately defined or may be given in a specific standard document (e.g., TS 36.211).

In a TDD serving cell, SRS transmission may occur in the UpPTS and UL subframe of an UL/DL configuration indicated by subframeAssignment, that is, a higher layer parameter for the serving cell.

If closed-loop UE transmission antenna selection is enabled with respect to a given serving cell for a UE supporting transmission antenna selection and frequency hopping is disabled (i.e., $b_{hop} \geq B_{SRS}$), "$a(n_{SRS})=n_{SRS} \bmod 2$" may be given with respect to the index $a(n_{SRS})$ of a UE antenna in which an SRS is transmitted in the time n_SRS and the entire sounding bandwidth. Furthermore, if frequency hopping is enabled (i.e., $b_{hop} < B_{SRS}$), the index $a(n_{SRS})$ of an UE antenna in which an SRS is transmitted in the time n_SRS may be given like Equation 20 (other than a case where single SRS transmission has been configured in the UE).

[Equation 20]

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

$$K = \prod_{b'=b_{hop}}^{B_{SRS}} N_{b'} \quad (N_{b_{hop}} = 1 \text{ regardless of } N_b)$$

In this case, BSRS, bhop, Nb and nSRS may be defined in Section 5.5.3.2 of TS 36.211. If one or more serving cells have been configured in a UE, the UE may not expect SRS transmission in different antenna ports at the same time.

A UE may be configured to transmit an SRS on the Np (it may be set by higher layer signaling) antenna port of a serving cell. For the PUSCH transmission mode 1 $N_p \in \{0, 1, 2, 4\}$ and for the PUSCH transmission mode 2 $N_p \in \{0, 1, 2\}$ with two the antenna ports configured for PUSCH and $N_p \in \{0, 1, 4\}$ with 4 antenna ports configured for PUSCH. A UE in which SRS transmission on multiple antenna ports of a serving cell have been configured needs to transmit an SRS for all transmission antenna ports configured within one SC-FDMA symbol of the same subframe of the serving cell.

SRS transmission bandwidth and start physical resource block allocation are the same with respect to all configured antenna port of a given serving cell.

A UE not configured with multiple timing advance groups (TAGs) should not transmits an SRS in a symbol whenever SRS and PUSCH transmissions overlap in the same symbol.

When one SC-FDMA symbol is present in the UpPTS of a given serving cell with respect to a TDD serving cell, this may be used for SRS transmission. When two SC-FDMA symbols are present in the UpPTS of a given serving cell, they may be used for SRS transmissions. The two SC-FDMA symbols may be allocated to the same UE with respect to the trigger type 0 SRS.

If a UE is not configured with multiple TAGs or a UE is configured with multiple TAGs and an SRS and PUCCH formats 2/2a/2b coincide in the same subframe within the same serving cell, A UE should not transmit an SRS triggered as Type 0 whenever an SRS triggered as the Type 0 and the 2/2a/2b transmission of the PUCCH format coincide in the same subframe.

A UE should not transmit an SRS triggered as Type 1 whenever an SRS triggered as Type 1 and the PUCCH format 2a/2b or the format 2 having HARQ-ACK transmission coincide in the same subframe.

A UE should not transmit the PUCCH format 2 not having HARQ-ACK whenever an SRS triggered as Type 1 and the PUCCH format 2 not having HARQ-ACK transmission coincide in the same subframe.

If multiple TAGs are not configured in a UE or multiple TAGs are configured in a UE and an SRS and a PUCCH coincide in the same subframe within the same serving cell, When ackNackSRS-SimultaneousTransmission is "FALSE", a UE should not transmit an SRS whenever PUCCH transmission and SRS transmission carrying HARQ-ACK and/or a positive scheduling request (SR) coincide within the same subframe.

When the parameter ackNackSRS-SimultaneousTransmission is "TRUE", in the case of FDD-TDD and a primary cell frame structure 1, a UE should not transmit an SRS in a symbol whenever PUCCH transmission and SRS transmission carrying a positive SR using a shortened format and/or HARQ-ACK overlap in the same symbol as defined in Paragraph 5.4.1 and Paragraph 5.4.2A of TS 36.211.

Unless prohibited otherwise, when the parameter ackNackSRS-SimultaneousTransmission is "TRUE", a UE needs to transmit an SRS whenever PUCCH transmission and SRS transmission carrying a positive SR using a shortened format and/or HARQ-ACK coincide in the same subframe as defined in Paragraph 5.4.1 and Paragraph 5.4.2 of TS 36.211.

A UE in which multiple TAGs have not been configured, as defined in Paragraph 5.4.1 and Paragraph 5.4.2A of TS 36.211, should not transmit an SRS whenever PUCCH transmission carrying a positive SR using a normal PUCCH format and/or HARQ-ACK and SRS transmission in any serving cell coincide in the same subframe.

In the UpPTS, whenever an SRS transmission instance overlaps a physical random access channel (PRACH) region for the preamble format 4 or exceeds the range of an UL system bandwidth configured in a serving cell, a UE should not transmit an SRS.

The parameter ackNackSRS-SimultaneousTransmission provided by higher layers determines whether a UE has been configured to support the transmission of an SRS and HARQ-ACK for a PUCCH in one subframe. If the UE has been configured to support the transmission of an SRS and HARQ-ACK for a PUCCH in one subframe, the UE needs to transmit the HARQ-ACK and the SR in a cell-specific SRS subframe of a primary cell using the shortened PUCCH format defined in Paragraphs 5.4.1 and 5.4.2A of TS 36.211. In this case, HARQ-ACK or an SR symbol corresponding to an SRS location may be punctured.

The shortened PUCCH format needs to be used in a cell-specific SRS subframe of a primary cell although a UE does not transmit an SRS in the corresponding subframe. The cell-specific SRS subframe has been defined in Paragraph 5.5.3.3 of TS 36.211. If not, the UE needs to use normal PUCCH formats 1/1a/1b, such as those defined in Paragraph 5.4.1 of TS 36.211, or the normal PUCCH format 3 defined in TS 36.211 5.4.2A for the transmission of HARQ-ACK and an SR.

The trigger type 0 SRS configuration of a UE within a serving cell for the SRS period $T_{SRS}$ and SRS subframe offset $T_{offset}$ may be defined in Table 7 and Table 8 for each FDD serving cell and each TDD serving cell, respectively. Table 7 illustrates a UE-specific SRS period $T_{SRS}$ and subframe offset configuration $T_{offset}$ for FDD and trigger type 0. Furthermore, Table 8 illustrates a UE-specific SRS period $T_{SRS}$ and subframe offset configuration $T_{offset}$ for TDD and the trigger type 0.

The SRS transmission period $T_{SRS}$ is specifically defined in a serving cell and is selected from sets {2, 5, 10, 20, 40, 80, 160, 320} ms or subframes.

TABLE 7

| SRS Configuration Index ISRS | SRS Periodicity $T_{SRS}$ (ms) | SRS Subframe Offset $T_{offset}$ |
|---|---|---|
| 0-1 | 2 | ISRS |
| 2-6 | 5 | ISRS − 2 |
| 7-16 | 10 | ISRS − 7 |
| 17-36 | 20 | ISRS − 17 |
| 37-76 | 40 | ISRS − 37 |
| 77-156 | 80 | ISRS − 77 |
| 157-316 | 160 | ISRS − 157 |
| 317-636 | 320 | ISRS − 317 |
| 637-1023 | reserved | reserved |

TABLE 8

| SRS Configuration Index ISRS | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | ISRS − 10 |
| 15-24 | 10 | ISRS − 15 |
| 25-44 | 20 | ISRS − 25 |
| 45-84 | 40 | ISRS − 45 |
| 85-164 | 80 | ISRS − 85 |
| 165-324 | 160 | ISRS − 165 |
| 325-644 | 320 | ISRS − 325 |
| 645-1023 | reserved | reserved |

In a TDD serving cell, 2 SRS resources are configured in a (half) frame including the UL subframe(s) of a given serving cell with respect to the SRS period $T_{SRS}$ of 2 ms.

SRS transmission instances triggered as Type 1 in a given serving cell with respect to a TDD serving cell and FDD serving cell, that is, $T_{SRS}$>2, correspond to subframes satisfying $(10 \cdot n_f + k_{SRS} - T_{offset}) \bmod T_{SRS} = 0$. In this case, in the case of FDD, $k_{SRS}$={0, 1, . . . , 9} corresponds to a subframe index within a frame, and in the case of a TDD serving cell, $k_{SRS}$ is defined in Table 9.

TABLE 9

| | subframe index n | | | | | | | | | |
|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $k_{SRS}$ in case UpPTS length of 2 symbols | 0 | 0 | 1 | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

SRS transmission instances for a TDD serving cell having $T_{SRS}=2$ may be subframes satisfying $(k_{SRS}-T_{offset})\bmod 5=0$.

With respect to a UE in which SRS transmission triggered as Type 0 has been configured in a TDD serving cell and a serving cell c and a UE in which a parameter EIMTA-MainConfigServCell-r12 has been configured in the serving cell c, when the UE does not detect a radio frame m (described in Paragraph 13.1) UL/DL configuration indication, the UE may not transmit a trigger type 0 SRS in the subframe of the radio frame m, indicated by a parameter eimta-HarqReferenceConfig-r12, as a DL subframe unless a PUSCH is not transmitted in the same subframe.

The trigger type 1 SRS configuration of a UE within a serving cell for the SRS period $T_{SRS,1}$ and SRS subframe offset $T_{offset,1}$ is defined in Table 10 and Table 11 with respect to each FDD serving cell and each TDD serving cell. Table 10 is a table illustrating a UE-specific SRS period $T_{SRS,1}$ and a subframe offset configuration $T_{offset,1}$ for a trigger type 1, FDD. Table 11 is a table illustrating a UE-specific SRS period $T_{SRS,1}$ and subframe offset configuration $T_{offset,1}$ for a trigger type 1, TDD.

TABLE 10

| SRS Configuration Index ISRS | SRS Periodicity $T_{SRS,1}$ (ms) | SRS Subframe Offset $T_{offset,1}$ |
|---|---|---|
| 0-1 | 2 | ISRS |
| 2-6 | 5 | ISRS − 2 |
| 7-16 | 10 | ISRS − 7 |
| 17-31 | reserved | reserved |

TABLE 11

| SRS Configuration Index ISRS | SRS Periodicity $T_{SRS,1}$ (ms) | SRS Subframe Offset $T_{offset,1}$ |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | ISRS − 10 |
| 15-24 | 10 | ISRS − 15 |
| 25-31 | reserved | reserved |

The SRS transmission period $T_{SRS,1}$ is serving-cell-specific and is selected from a {2, 5, 10}ms or subframe set.

In a TDD serving cell, with respect to the SRS period $T_{SRS,1}$ of 2 ms, two SRS resources are configured in a half frame including the UL subframe(s) of a given serving cell.

A UE which is configured for SRS transmission triggered as Type 1 in a serving cell c, but in which a carrier indicator field has not been configured needs to transmit an SRS to the serving cell c when detecting a positive SRS request in a PDCCH/EPDCCH scheduling PUSCH/PDSCH on the serving cell c.

A UE in which SRS transmission triggered as Type 1 has been configured in a serving cell c and a carrier indicator field has been configured needs to transmit an SRS to the serving cell c when detecting a positive SRS request in a PDCCH/EPDCCH scheduling PUSCH/PDSCH having a value of the carrier indicator field corresponding to the serving cell c.

When a positive SRS request is detected in the subframe n of a serving cell c, a UE in which Type 1 trigger SRS transmission has been configured in the serving cell c initiates the SRS transmission in the first subframe satisfying $n+k, k \geq 4$ and $(10 \cdot n_f + k_{SRS} - T_{offset,1}) \bmod T_{SRS,1}=0$ in the case of a TDD serving cell c and FDD serving cell c having $T_{SRS,1}>2$, and initiates the SRS transmission in the first subframe satisfying $(k_{SRS}-T_{offset,1}) \bmod 5=0$ in the case of the TDD serving cell c, that is, $T_{SRS,1}=2$. In this case, $k_{SRS}=\{0,1,\ldots,9\}$ is a subframe index within a frame of in the case of the FDD serving cell c, and $k_{SRS}$ is defined in Table 9 in the case of the TDD serving cell c.

A UE in which SRS transmission triggered as Type 1 has been configured does not expect the reception of a Type 1 SRS triggering event related to different values of trigger type 1 SRS transmission parameters as configured by higher layer signaling with respect to the same subframe and the same serving cell.

With a UE in which EIMTA-MainConfigServCell-r12 has been configured with respect to a TDD serving cell c and a serving cell c, a UE does not transmit an SRS in the subframe of a radio frame indicated by a corresponding eIMTA-UL/DL-configuration as a DL subframe.

A UE should not transmit an SRS corresponding to a random access response grant and an SRS whenever PUSCH transmission or the retransmission of the same transport block, that is, part of a contention-based random access procedure, coincide in the same subframe.

SRS Hopping Method

In the following embodiments, an SRS resource and SRS resources are interchangeably used, for convenience of description, but an SRS resource may be interpreted as SRS resources (or SRS resource set) and vice versa.

FIG. 13 is a diagram illustrating an LTE SRS hopping pattern where $n_s=1 \rightarrow n_s=4$ according to an embodiment of the present invention.

An LTE SRS hopping has the following characteristics.

perform an SRS hopping operation only when periodic SRS triggering (triggering Type 0) is performed allocation of SRS resources is provided as a preconfigured hopping pattern hopping pattern is RRC-configured/designated/indicated in a UE-specific manner (in this case, overlapping is not permitted) $b_{hop} \in \{0,1,2,3\}$ SRS is frequency-hopped using a hopping pattern even subframe in which a cell/UE-specific SRS is transmitted.

SRS frequency-domain starting location and hopping formula are interpreted through the following equation.

[Equation 21]

$$k_0^{(p)} = \bar{k}_0^{(p)} + \sum_{b=0}^{B_{SRS}} K_{TC} M_{sc,b}^{RS} n_b$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} \left\lfloor N_b/2 \right\rfloor \left[ \dfrac{n_{SRS} \bmod \prod_{b'=b_{hop}}^{b} N_{b'}}{\prod_{b'=b_{hop}}^{b-1} N_{b'}} + \dfrac{n_{SRS} \bmod \prod_{b'=b_{hop}}^{b} N_{b'}}{2 \prod_{b'=b_{hop}}^{b-1} N_{b'}} \right] & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

$$n_{SRS} = \begin{cases} 2N_{SP} n_f + 2(N_{SP}-1)\lfloor \frac{n_s}{10} \rfloor + \lfloor \frac{T_{offset}}{T_{offset\_max}} \rfloor, & \text{for } 2msSRS \text{ periodicity of } framestructuretype2 \\ \lfloor (n_f \times 10 + \lfloor n_s/2 \rfloor)/T_{SRS} \rfloor, & \text{otherwise} \end{cases}$$

In this case, $n_{SRS}$ indicates a hopping progress interval in the time domain, $N_b$ may be determined as the number of branches allocated to a tree level b, and b may be determined as a $B_{SRS}$ configuration in dedicated RRC.

The following shows an LTE hopping pattern example.
1) a parameter configuration in cell-specific RRC
$C_{SRS}=1$, $N_{RB}^{UL}=100$, $n_f=1$, $n_s=1$
2) a parameter configuration (corresponding to FIG. 13 embodiment)
In UE-specific RRC,
UE A: $B_{SRS}=1$, $b_{hop}=0$, $n_{RRC}=22$, $T_{SRS}=10$
UE B: $B_{SRS}=2$, $b_{hop}=0$, $n_{RRC}=10$, $T_{SRS}=5$
UE C: $B_{SRS}=3$, $b_{hop}=2$, $n_{RRC}=23$, $T_{SRS}=2$ The following DL L1 (Layer 1)/L2 (Layer 2) beam management procedure may be supported in one or a plurality of TRPs:

P-1 (procedure): P-1 may be used to enable UE measurement for different TRP Tx beams for supporting the selection of TRP transmission (Tx) beams/UE reception (Rx) beam(s). In general, the beamforming of a TRP may include intra/inter-TRP Tx beam sweeping from a set of different beams (or using a set consisting of different beams). In general, the beamforming of a UE may include UE Rx beam sweeping from a set of different beams (or using a set consisting of different beams). A TRP Tx beam and a UE Rx beam may be determined jointly or sequentially. If they are sequentially determined, for example, after the TRP Tx beam is first determined, and the UE Rx beam may be determined based on the determined TRP Tx beam.

P-2 (procedure): P-2 is used to enable the measurement of a UE for different TRP Tx beams in order to determine/change an inter/intra-TRP Tx beam(s). That is, since such P-2 has an object for a UE to determine an optimal/proper TRP Tx beam(s), the UE measures different TRP Tx beams (more specifically, measure RSs transmitted through different TRP Tx beams) and does not perform repetitive measurement on the same TRP Tx beam. Accordingly, if P-2 has been configured, Tx beams transmitted/mapped transmitted by RS (e.g., CSI-RS) resources within the same/one RS resource set may be different for each resource. In this case, Rx beams used for the measurement of the different TRP Tx beam(s) may be fixed to the same beam, and may correspond to Rx beams determined/selected in P-3 to be described below.

In such P-2, UE measurement may be performed on a Tx beam set (i.e., a beam set of a narrower range) smaller than that of P-1 for beam refinement finer than that of P-1. Accordingly, P-2 may be considered to be a special case of P-1.

P-3 (procedure): P-3 is used to enable the (repetitive) measurement of a UE for the same TRP Tx beam so as to determine/change a UE Rx beam if the UE uses beamforming. That is, since such P-3 has an object for a UE to determine an optimal/proper Rx beam, the same TRP "Tx" beam may be "repetitively" measured/received using different "Rx" beams (more specifically, RSs transmitted through the same TRP Tx beams are measured using different Rx beams). In this case, the same TRP "Tx" beam that is repetitively measured may be a Tx beam previously determined/selected through P-2. Accordingly, if P-3 has been configured, Tx beams in which RS (e.g., CSI-RS) resources are transmitted/mapped within the same RS resource set may be the same for each resource.

The same procedure design for Intra-TRP and inter-TRP beam management needs to be researched. In this case, a UE may not be aware whether the procedure design is an intra-TRP beam or an inter-TRP beam.

For example, P-2 and P-3 (procedure) may be performed in common and/or plural times in order to achieve the simultaneous change of a TRP Tx/UE RX beam.

The procedure P-3 may have an influence on a physical layer procedure or not. Multi-Tx/Rx beam pair management for a UE may be supported.

Assistance information from another carrier may be searched in the beam management procedure.

The above procedure may be applied to all frequency bands. Furthermore, the above procedure may be used in a single/multiple beams per TRP. Multi/single beam-based initial access and mobility may be handled in a separate RAN1 agenda item.

Hereinafter, an UL beam management procedure is described later. The UL beam management procedure may be defined similarly to the above-described DL beam management procedure, and may be basically divided into the following types:

U-1 (procedure): this may be used to enable TRP measurement for different UE Tx beams in order to assist the selection of a UE Tx beam/TRP Rx beam. Such U-1 may correspond to the above-described P-1, and is not essentially useful in all cases.

U-2 (procedure): this may be used to enable TRP measurement for different TRP Rx beams in order to change/select an inter/intra-TRP Rx beam(s). Such U-2 may correspond to the above-described P-2.

U-3 (procedure): this may be used to enable (repetitive) TRP measurement for the same TRP Rx beam in order to change a UE Tx beam if a UE uses beamforming. Such U-3 may correspond to the above-described P-3.

In relation to such procedures, the indication of various Tx/Rx beam coincidences/matching/correspondences-related information may be supported.

UL beam management may be performed based on the following channel/RS:

PRACH
SRS
DM-RS

Other channels and reference signals are not excluded.

A TRP and UE may have a Tx/Rx beam correspondence/coincidence.

Alternatively, the TRP may not have a Tx/Rx beam coincidence/matching/correspondence, and/or the UE may not have a Tx/Rx beam coincidence/matching/correspondence.

A CSI-RS may support DL Tx beam sweeping and UE Rx beam sweeping. In this case, the CSI-RS may be used for P-1, P-2 and P-3.

An NR CSI-RS may support the following mapping structure:

N_p CSI-RS port(s) may be mapped for each (sub) time unit. The same CSI-RS antenna ports may be mapped to the (sub) time units. In this case, the "time unit" means OFDM symbols, that is, n≥1, in the configuration/reference numerology. The OFDM symbols configuring the time unit may be disposed on the time-domain contiguously or discontiguously. FDM, TDM, CDM or various combinations of them may be present as a port multiplexing method.

Each time unit may be divided in a sub-time unit. A division method may include a division method of an OFDM symbol-level which is the same as TDM, interleaved FDMA (IFDMA), a reference OFDM symbol length (subcarrier spacing), for example, or has a shorter OFDM symbol length (i.e., larger subcarrier spacing). In addition, other methods are not excluded. Such a mapping structure may be used to assist a multi-panel/Tx chain.

The following CSI-RS mapping options for Tx and Rx beam sweeping may be present:

1. Option 1: a Tx beam(s) is the same as for each sub-time unit within each time unit. A Tx beam(s) is different for each time unit.

2. Option 2: a Tx beam(s) is different for each sub-time unit within each time unit. A Tx beam(s) is the same for each time unit.

3. Option 3 (a combination of Option 1 and Option 2): a Tx beam(s) is the same for each sub time within one time unit. A Tx beam(s) is different for each sub time within another time unit. In the number and period viewpoint, different time units may be combined.

Any one of Tx sweeping and Rx sweeping may be possible. The above-described mapping structure may be configured with one or a plurality of CSI-RS resource configurations.

NR may be UL-MIMO scheduled by DCI including at least one of the followings:

Indication (SRI) of an SRS resource transmitted by a UE in a previous time instance, and each configured SRS resource is associated with at least one UL Tx beam/precoder. The presence of this field is permitted only when several SRS resources have been configured in a UE.

Transmission rank indicator (TRI), and a possible value is up to the number of SRS ports configured in an indicated SRI.

Wideband transmission PMI (TPMI) including a dual stage codebook, and a possible precoding matrix (PM) depends on the number of SRS ports configured in an indicated SRI. This field may be present for non-codebook-based UL-MIMO transmission. A sub-band TPMI may be supported.

UL modulation coding scheme (MCS) indication
UL HARQ-related information
UL resource allocation
Multiple SRI indication and a corresponding TRI(s) and TPMI(s)
Joint encoding or separate encoding codebook-based transmission for UL may be supported at least by the following signaling in an UL grant:

SRI+TPMI+TRI, in this case, the TPMI is used to indicate a preferred precoder through the SRS ports of an SRS resource selected by an SRI. When a single SRS resource is configured, there is no SRI. In this case, a TPMI is used to indicate a preferred precoder through the SRS ports of a single configured SRS resource.

Indication support for several SRS resource selection
NR supports aperiodic SRS triggering in DCI.
It may support at least one state of fields capable of selecting at least one of configured SRS resources.

An X-port SRS resource may be configured in a UE. The SRS resource may span over one or several OFDM symbols within a single slot.

All X SRS ports may be sounded or not in each OFDM symbol.

For at least CSI acquisition:

A multi-symbol SRS resource may be configured so that an X SRS port is transmitted at a difference location of a different OFDM symbols band of a slot according to a frequency hopping method in each OFDM symbol. This permits the sounding of a greater part (or the entire) of a UE bandwidth using narrower band SRS transmission.

All X ports are sounded in the same part of a band in all OFDM symbols.

If a UE RF implementation aspect on an SRS design is taken into consideration, restrictions may be applied to the design of a symbol-wise hopping pattern (e.g., a required time for frequency re-tuning (if re-tuning is necessary) or a transient period if re-tuning is not necessary)

NR supports an aperiodic SRS triggering/request field in UL-related DCI.

N-bits field: the first codepoint (or value, state) corresponds to "SRS transmission triggering", and an n-th codepoint (or value, state) may select/trigger at least one configured SRS resources. That is, in an aperiodic SRS triggering field, the first (or specific) codepoint (or value, state) indicates "SRS transmission triggering", and an n-th (any one of codepoints other than the specific codepoint) codepoint may indicate at least any one of configured SRS resources (as a triggered SRS resource). Accordingly, one or a plurality of SRS resource(s) may be jointly encoded for each state within each SRI field. In this case, each state or codepoint (candidate) may be previously configured/described/indicated/defined through RRC/medium access control (MAC), and a specific state or codepoint may be selected/indicated/triggered dynamically. The field needs to be distinguished from an SRI field as an independent field.

As described above, an aperiodic SRS triggering field (hereinafter, this is called an "ASRS field", for convenience sake) may be included in a specific DCI (e.g., UL-related DCI, DL-related DCI and/or separated common DCI). When a specific n-th state (codepoint/value) is dynamically indicated through the ASRS field, an operation to be followed by a UE may be previously configured as at least one of the followings by L3 signaling (e.g., by RRC) and/or L2 signaling (e.g., by a MAC control element (CE)):

1. Each codepoint/value/state may indicate one or a plurality of SRS resource(s). And/or each indicated SRS resource may be explicitly identified as a previously "aperiodic SRS" resource type (e.g., although information, such as a subframe/slot period/offset for a corresponding resource, is not configured or configured, if the information is configured as an "aperiodic SRS" type, the corresponding information may be defined/configured to be neglected). And/or information, such as a subframe/slot period/offset specified/configured for aperiodic SRS resource, may be information meaning "possible aperiodic SRS transmission instances." That is, a UE may consider a case where a subframe/slot in which a specific ASRS field is transmitted/received is not included in the information (or when a subframe/slot instance at which SRS transmission is indicated by a corresponding ASRS field is not included in the information) to be an error case. And/or an operation may be defined/configured so that a UE performs SRS transmission on only an SRS resource(s) satisfying only a condition (i.e., when a subframe/slot in which a specific ASRS field is transmitted/received is included in the information or when a subframe/slot instance at which SRS transmission is indicated by a corresponding ASRS field is included in the information). And/or if an instance at which an ASRS field is transmitted/received is an m-th slot, a slot instance at which a UE transmits an SRS triggered/indicated by the corresponding ASRS field may be determined as an aperiodic SRS transmission slot instance that appears/is present most early among instances after the (m+q)-th slot instance and/or (m+q)-th slot of "possible aperiodic SRS transmission instances." In this case, the g value may be pre-defined/configured like q=4, for example, or an independent/different q value may be assigned depending on various conditions/parameters, such as a specific "slot configuration" (e.g., the q value may be separately indicated/configured/signaled).

1-A. If a specific codepoint/value/state indicating a single SRS resource is dynamically indicated, a UE may initiate SRS transmission at an instance according to a specific defined/configured timeline for a corresponding SRS resource (e.g., a k-th subframe/slot instance from a subframe/slot instance at which an ASRS field is transmitted/received or after it and/or at an SRS-resource-specific slot/subframe offset instance separately signaled/indicated by an RRC parameter).

1-A-i. In this case, if information, such as a specific subframe/slot period/offset meaning "possible aperiodic SRS transmission instances", has been previously configured with respect to an SRS resource, a UE may be limited to perform SRS transmission only when a currently indicated subframe/slot instance (i.e., a subframe/slot instance at which SRS transmission is indicated/triggered by an ASRS field) (or an SRS transmission subframe/slot instance indicated by a corresponding ASRS field) is included in information, such as a specific subframe/slot period/offset meaning the "possible aperiodic SRS transmission instances." And/or assuming that an instance at which an ASRS field is transmitted/received is an m-th slot/subframe, a slot/subframe instance at which an SRS indicated/triggered by the corresponding ASRS field will be transmitted may be determined as a slot/subframe instance that is present/appears most early among instances after the (m+q)-th slot/subframe instance and/or (m+q)-th slot/subframe in a specific subframe/slot period/offset meaning the "possible aperiodic SRS transmission instances." In this case, the g value may be pre-defined/configured like q=4, for example, or an independent/different q value may be assigned depending on various conditions/parameters, such as a specific "slot/subframe configuration" (e.g., the q value may be separately indicated/configured/signaled).

1-B. If a specific codepoint/state/value in which a plurality of SRS resources (i.e., SRS resource set) is indicated/triggered is dynamically indicated, a UE may initiate SRS transmission at an instance according to a specific defined/configured timeline for the corresponding SRS resources (e.g., a subframe/slot after k-th from an instance at which an ASRS field has been received and/or an SRS-resource-set-specific slot/subframe offset instance separately signaling/indicated by an RRC parameter).

1-B-i. In this case, if information, such as a specific subframe/slot period/offset meaning "possible aperiodic SRS transmission instances", has been previously configured with respect to SRS resources (for each SRS resource), a UE may be limited to perform SRS transmission only when a currently indicated subframe/slot instance (i.e., a subframe/slot instance in which the SRS transmission has been indicated/triggered by an ASRS field) (or an SRS transmission subframe/slot instance indicated by the corresponding ASRS field) is included in information, such as a specific subframe/slot period/offset meaning the "possible aperiodic SRS transmission instances." In this case, the UE may be defined/configured to initiate the transmission of the corresponding SRS resources only when all the triggered/indicated SRS resources satisfy the condition. If only some of the triggered/indicated SRS resources satisfy the condition, a UE may be defined/configured to initiate SRS transmission on only an SRS resource satisfying the condition. And/or assuming that an instance at which an ASRS field is transmitted/received is an m-th slot/subframe, a slot/subframe instance at which an SRS indicated/triggered by the corresponding ASRS field will be transmitted may be determined as a slot/subframe instance that is present/appears most early among instances after the (m+q)-th slot/subframe instance and/or (m+q)-th slot/subframe of a specific subframe/slot period/offset meaning the "possible aperiodic SRS transmission instances." In this case, the g value may be pre-defined/configured like q=4, for example, or an independent/different q value may be assigned depending on various conditions/parameters, such as a specific "slot/subframe configuration" (e.g., the q value may be separately indicated/configured/signaled).

2. And/or information related to a symbol(s) location where an SRS will be transmitted may be indicated/configured (together/in a pairing form) (through RRC signaling) within a subframe/slot (e.g., a subframe/slot after k-th from an instance at which an ASRS field is transmitted/received) additionally indicated/determined with respect to at least one SRS resource triggered/indicated in each codepoint/value/state (for each triggered/indicated SRS resource).

2-A. For example, assuming that a specific codepoint/value/state A (e.g., "001" for N=3) triggers/indicates two SRS resources, an SRS resource#1 and an SRS resource#2, a single symbol index (e.g., 4) may be additionally configured with respect to the codepoint/value/state A (e.g., it may be configured by RRC or may be configured/updated by MAC). In this case, a UE may transmit both the SRS resource#1 and SRS resource#2 with respect to the symbol index 4, and may transmit each frequency resource location depending on the configuration.

2-B. For example, assuming that a specific codepoint/value/state B (e.g., "010" for N=3) triggers/indicates two SRS resources, an SRS resource#1 and an SRS resource#2, two symbol indices 3 and 5 may have been additionally configured together with respect to the codepoint/value/state B (e.g., they may be configured by RRC or may be configured/updated by MAC). In this case, a UE transmits both the SRS resource#1 and SRS resource#2 with respect to the symbol indices 3 and/or 5, and transmits each frequency resource location depending on the configuration. For example, if hopping has not been configured/indicated, transmission according to the hopping may be performed on two symbols within a corresponding slot if only repetition transmission, inter-slot hopping has been configured/indicated with respect to the same frequency resource region and may be performed on a different frequency resource region over two symbols depending on a corresponding operation if repetition transmission, intra-slot hopping has been configured/indicated with respect to the same frequency resource region.

3. And/or transmission resource hopping pattern-related indicator information within a subframe/slot (e.g., a subframe/slot after k-th from an instance at which an ASRS field has been download) additionally determined/indicated with respect to at least one SRS resource triggered/indicated in each codepoint/value/state (for each indicated SRS resource) may be indicated/configured (together/in a pairing form).

FIG. 14 is a diagram illustrating an SRS hopping pattern according to an embodiment of the present invention.

In this specification, a transmission resource hopping pattern basically starts in such a manner that the pattern can be greatly hopped within a "specific SRS transmission region" to a maximum extent as in FIG. 14, but may be defined/configured in a form in which a band not transmitted is filled with transmission one by one.

For example, assuming a case where a "specific SRS transmission region" is divided into four equal parts like [1 2 3 4], a hopping pattern "H1" may be defined/configured in a form in which the hopping pattern proceeds like 1→3→2→4→ (and again) 1→3→ . . . . And/or, for example, a hopping pattern "H2" may be defined/configured in a form in which the hopping pattern proceeds like 2→4→1→3→ (and again) 2→4→ . . . . And/or for example, a hopping pattern "H3" may be defined/configured in a form in which the hopping pattern proceeds like 3→1→4→2→ (and again) 3→1→ . . . .

And/or, for example, assuming a case where a "specific SRS transmission region" is equally divided into eight equal parts like [1 2 3 4 5 6 7 8], for example, a hopping pattern "H1" may be defined/configured in a form in which the hopping pattern proceeds like 1→5→3→7→2→6→4→8→ (and again) 1→5→3→7→ . . . . And/or, for example, a hopping pattern "H2" may be defined/configured in a form in which the hopping pattern proceeds like 2→6→4→8→1→5→3→7→ (and again) 2→6→4→8→ . . . . And/or, for example, a hopping pattern "H3" may be defined/configured in a form in which the hopping pattern proceeds like 3→7→1→5→4→8→2→6→ (and again) 3→7→1→5→ . . . .

In addition to such an example, another specific pattern for defining a specific frequency hopping in a form, such as that described above, may be separately be defined/configured. A modified embodiment of such a similar form may be included in the spirit of the present invention. A specific hopping pattern, such as H1, H2 or H3, may be pre-defined and/or pre-configured (e.g., by RRC and/or MAC). And/or a hopping pattern itself is not previously regulated, but may be supported so that a base station "explicitly" indicates/configures a hopping pattern as a kind of "on the fly" through RRC and/or MAC signaling with respect to a UE.

If different hopping operations, including such modified embodiments, are defined/configured as H1, H2, H3, . . . , a (separate) configuration may be provided so that the different hopping operations are specifically specified/limited as "inter-slot" hopping patterns. That is, if a hopping pattern has been defined/configured in an "inter-slot" hopping form, numbers within the hopping pattern may be defined/configured to be applied at different slot instances.

For example, in the case of an inter-slot hopping pattern "1→5→3→7→ . . . ", a UE must perform an operation of transmitting an SRS in a No. "1" band at the first slot instance and transmitting an SRS in a No. "5" band at the second slot instance. In this case, if SRS transmission for a plurality of symbols is indicated at each slot instance (unless a separate "intra-slot" hopping pattern is configured together), a UE may perform repetition transmission on a band for each slot (e.g., a No. "5" band if the band is the No. "5" band) according to a hopping pattern with respect to the plurality of symbols.

As a result, the "inter-slot hopping pattern" is applied according to/depending/based on when a specific slot instance at which an ASRS field is transmitted/received is. A method of hopping bands one by one whenever a pattern for inter-slot hopping, such as "1→5→3→7→ . . . ", is triggered/indicated by an ASRS field with respect to a corresponding SRS resource may also be applied.

In this case, this method may have a disadvantage in that it is vulnerable to DCI error propagation. In order to reduce the disadvantage, a definition/configuration may be performed so that a UE periodically/intermittently transmits, to a base station, feedback/progress information, such as that the UE now performs/proceeds SRS transmission on a band at what place (corresponding to a number for each hopping pattern). And/or an operation for a UE to (separately) receive a specific hopping initialization-related message from a base station so that the UE initializes and restarts a hopping sequence may also be defined/configured.

And/or if an "intra-slot" hopping form is defined/configured, the numbers may be defined/configured to be applied to different symbol instances. For example, in the case of an intra-slot hopping pattern "1→5→3→7→ . . . " (in an indicated slot (if SRS transmission for a plurality of symbols is indicated)), a UE needs to perform an operation of transmitting an SRS in the first (indicated) symbol of a No. "1" band in the indicated slot and transmits an SRS in the second (indicated) symbol if a No. "5" band. In this case, the "intra-slot hopping pattern" may be applied (cumulatively/contiguously/sequentially) according to/depending/based on when a specific slot instance at an ASRS field is transmitted/received is. A method of hopping bands one by one whenever a pattern for intra-slot hopping, such as "1→5→3→7→ . . . ", is triggered by an ASRS field with respect to a corresponding SRS resource (and/or cumulatively whenever SRS transmission (one or a plurality of times) is initiated based on the number of symbols indicated within a corresponding slot) may also be applied. In this case, this method may have a disadvantage in that it is vulnerable to DCI error propagation. In order to reduce the disadvantage, a definition/configuration may be performed so that a UE periodically/intermittently transmits, to a base station, feedback/progress information, such as that the UE now performs/proceeds SRS transmission on a band at what place (corresponding to a number for each hopping pattern). And/or an operation for a UE to (separately) receive a specific hopping initialization-related message from a base station so that the UE initializes and restarts a hopping sequence may also be defined/configured.

And/or the pattern for intra-slot hopping, such as "1→5→3→7→ . . . ", may be limited to be applied to only a single transmission slot instance indicated by a corresponding ASRS field only (or determined by the corresponding ASRS field) (e.g., an instance after a k-th slot from an instance at which an ASRS field is transmitted/received). That is, although an ASRS field is transmitted/received in another slot, when SRS transmission according to the corresponding ASRS field is performed, a UE may always initiate a hopping sequence newly from a No. "1" band (i.e., the first band within the hopping pattern) without connecting to a previous hopping sequence.

And/or a definition/configuration method both in the "inter- and intra-slot" hopping forms may also be applied. In this case, numbers indicating frequency bands within a hopping pattern may be applied to different symbol instances and at the same time, may be defined/configured/applied in a form in which a frequency hopping sequence is connected although SRS triggering according to an ASRS field transmitted/received at a next slot instance is performed.

For example, in the case of "1→5→3→7→ . . . " for both "inter- and intra-slot" hopping (at an indicated corresponding slot (if SRS transmission for two symbols is indicated)), a UE may transmit an SRS in the first (indicated) symbol of a No. "1" band and transmit an SRS in the second (indicated) symbol of a No. "5" band in the indicated slot. Furthermore, if an ASRS field is transmitted/received again (and if SRS transmission for two symbols is indicated) in another subsequent slot, the UE may transmit an SRS the No. "3" band of the first symbol and transmit an SRS in the No. "7" band of the second symbol in the indicated slot. Furthermore, if an ASRS field is transmitted/received again (and if SRS transmission for two symbols is indicated) in another subsequent slot, the UE may transmit an SRS in the No. "2" band of the first symbol and transmit an SRS in the No. "6" band of the second symbol in the indicated slot. And/or if an ASRS field is transmitted/received again (and if SRS transmission for one symbol is indicated) in another subsequent slot, the UE may transmit an SRS in the No. "4" band of the corresponding symbol in the indicated slot. Furthermore, if an ASRS field is transmitted/received again (and if SRS transmission for two symbols is indicated) in another subsequent slot, the UE may transmit an SRS in the No. "8" band of the first symbol and transmit an SRS in the No. "1" band of the second symbol in the indicated slot.

In this case, this method may have a disadvantage in that it is vulnerable to DCI error propagation. In order to reduce the disadvantage, a definition/configuration may be performed so that a UE periodically/intermittently transmits, to a base station, feedback/progress information, such as that the UE now performs/proceeds SRS transmission on a band at what place (corresponding to a number for each hopping pattern). And/or an operation for a UE to (separately) receive a specific hopping initialization-related message from a base station so that the UE initializes and restarts a hopping sequence may also be defined/configured.

3-A. For example, a specific codepoint/state/value C (e.g., "011" for N=3) may indicate an SRS resource#1 and an SRS resource#2, two symbol indices 3 and 5 may be additionally configured with respect to a codepoint/state/value C, and a specific hopping pattern/indicator "H1" may have been additionally configured together (e.g., it may be configured by RRC or may be configured/updated by MAC). In this case, a method regarding that how the hopping pattern/indicator "H1" will be configured may comply with at least one of the above-described methods. In this case, a UE transmits both the SRS resource#1 and the SRS resource#2 with the indicated/configured symbol indices 3 and 5, and each frequency resource location complies with a configuration of the hopping pattern/indicator "H1."

3-A-i. the hopping pattern/indicator "H1" may be configured only in the above-described "inter-slot" hopping form. And/or, 3-A-ii. the hopping pattern/indicator "H1" may be configured only in the above-described "intra-slot" hopping form. And/or, 3-A-iii. the hopping pattern/indicator "H1" may be configured in the above-described both "inter- and intra-slot" hopping form.

Other SRS transmission-related parameters not described in this specification (e.g., a sequence initialization parameter(s), a transmission comb value/offset, cyclic shift-related information, an SRS bandwidth, the number of SRS ports, QCL possible with respect to other reference signals (i.e., SRS special-related/relation (assumption) information)) may be indicated/configured through RRC signaling for each configured SRS resource (and/or SRS set) and/or some parameter(s) may be updated/reconfigured by MAC and/or DCI.

In this case, the QCL possible with respect to other signals (i.e., SRS spatial-related information) indicates reference signal information (i.e., corresponding SRS and QCL/space assumption/related other signal information) indicating that "space-related/QCL/same Tx beam/same spatial domain transmission filter" can be applied to an indicated/configured SRS resource (set). For example, the QCL may include a corresponding SRS and a QCL/space assumption/related SSB index, a CSI-RS index and/or SRS ID information.

That is, such a parameter(s) may be basically limited to a form in which the parameter(s) is excluded from a parameter that may be dynamically indicated through an ASRS field, and has an advantage in that tradeoff between performance/overhead can be effectively satisfied/maintained because only a specific SRS resource(s) (and/or hopping resource location-related information) can become the subject of dynamic indication through a restricted ASRS field.

However, additionally, a method of defining/configuring some of such parameter(s) in a form similar to that described above for each codepoint/value/state of the ASRS field may also be applied (in this case, DCI overhead may be added).

As another technology proposed in this specification, an ASRS field may be joint-encoded within the same DCI as an SRI field. Joint encoding may include that a specific codepoint/value/state may include the indication object (e.g., UL data scheduling object) of an SRI and/or an indication object (e.g., SRS transmission triggering object) of an ASRS in such a manner that they are configurable.

For example, a specific codepoint/value/state may have included only a specific SRS resource (set) ID(s) as the indication object (e.g., for UL data scheduling) of an SRI, and another specific codepoint/value/state may have included only a specific SRS resource (set) ID(s) (and/or hopping-related information) as the indication object (e.g., for SRS transmission triggering) of an ASRS, and/or Another specific codepoint/value/state may have included {a specific SRS resource (or set) ID(s) as the indication object (e.g., for UL data scheduling) of an SRI} and {a specific SRS resource (or set) ID(s) (and/or the hopping-related information) as the indication object (e.g., for SRS transmission triggering) of an ASRS}.

That is, the indication object of an SRI and/or an SRS resource (set) of the indication object of an ASRS may be independently indicated for each codepoint/value/state.

Identifier/information (or for indicating "indication object") related to such a specific "indication object" may also be (explicitly and/or implicitly) included as configuration information.

And/or the SRI field of the ASRS field may be designed/configured/included within an integrated one field "X"

That is, if only a specific SRS resource (or SRS resources, an SRS resource set) ID(s) is included in a specific codepoint/value/state which may be indicated through a specific field "X", a UE may be defined/configured to interpret the SRS resource (or SRS resources, SRS resource set), indicated through the corresponding ID(s), as the SRI as UL data scheduling information and at the same time, to also perform the SRS transmission of the SRS resource (or SRS resources, SRS resource set) indicated through the corresponding ID(s), based on the indication object of the ASRS field and/or if a specific SRS resource (or SRS resources, an SRS resource set) ID(s) and hopping-related information is included (partially) together in a specific codepoint/value/state state which may be indicated through a specific field "X", a UE may be defined/configured to interpret the SRS resource (or SRS resources, SRS resource set), indicated through the corresponding ID(s), as the SRI as UL data scheduling information and at the same time, to also perform the SRS transmission (based on indicated hopping-related information) of the SRS resource (or SRS resources, SRS resource set), indicated through the corresponding ID(s), based on the indication object of the ASRS.

At least one of proposed technologies related to an ASRS field in this specification may be applied to a specific SRS resource configured in a "semi-persistent" type identically/similarly. To this end, a separately separated semi-persistent (Sp) SRS field may be defined/configured. And/or specific DCI including such an SpSRS field may be detected as a DCI(s)/MAC CE differently masked with a separate RNTI. A specific codepoint/value/state within the SpSRS field may comply with at least one of ASRS field-related proposed methods. A UE that has received a DCI(s)/MAC CE including a corresponding SpSRS field may continue to initiate/perform SRS transmission based on indication information of an SpSRS field "of an enabling object" from a corresponding reception instance (or from a specific instance operating in conjunction with the corresponding instance). In this case, information, such as the first band value of a hopping pattern that needs to be applied to the first SRS transmission, may be regulated/determined by/based on the SpSRS field.

As described above, a UE may continue to transmit a corresponding SRS until an enabling message updated by another SpSRS field is received after semi-persistent SRS transmission is enabled. The UE may comply with the above operation again from the beginning from an instance at which the updated enabling message is received. And/or when a separately defined/configured disabling message is received, the UE may stop SRS transmission for a specific SRS resource(s) corresponding/related to the corresponding disabling message.

Such an SpSRS field is not separately defined/configured and may be indicated/configured with or may be encoded in common along with another information/field within a specific codepoint/value/state within the ASRS field.

In the above-described ASRS-related proposal operation, if a specific SRS resource(s) has been an SRS resource previously configured in a "semi-persistent" type (i.e., if a higher layer parameter "SRS-ResourceConfigType" for the corresponding SRS resource has been configured to be "semi-persistent"), an SpSRS field-related proposed/described operation may be applied (recognize it as activation) with respect to the corresponding resource, if a specific SRS resource(s) has been an SRS resource previously configured in an "aperiodic" type (i.e., if a higher layer parameter "SRS-ResourceConfigType" for the corresponding SRS resource has been configured to be "aperiodic"), an ASRS field-related proposed/described operation may be applied (recognize it as aperiodic transmission) with respect to the corresponding resource.

And/or at least one method of the operations described/proposed in the present invention may also be applied to periodic SRS transmission. That is, the "inter-slot", "intra-slot" and/or "both inter- and intra-slot"-related hopping operations may be previously configured/indicated so that a corresponding operation is periodically applied to the periodic Type of a specific SRS resource through RRC signaling (and/or MAC signaling)/higher-layer signaling.

And/or a specific restriction may be defined/configured so that at least one of the methods proposed in this specification can be applied/assigned to the "type of a specific SRS resource (e.g., an SRS resource (type) for UL CSI acquisition and/or an SRS resource (type) for DL CSI acquisition (e.g., based on channel reciprocity)."

For example, an SRS resource (type) for UL Beam management (BM) may be limited so that at least a hopping-related operation is not configured (e.g., hopping may be always disabled). For example, unlike in an SRS resource for CSI acquisition, inter-slot non-hopping (i.e., inter-slot hopping is always disabled) and/or intra-slot non-hopping (i.e., intra-slot hopping is always disabled) may be applied/configured with respect to an SRS resource for UL-BM. The reason for this is that the object itself is for finely measuring a frequency selective channel like CSI acquisition and also for managing a beam direction (of a (relatively) wideband). That is, an SRS for UL BM not frequency hopping may be configured/provided in a different form, such as a form in which SRS transmission resources are uniformly distributed with relatively low-density in a relatively wide band or an SRS resource (between a plurality of symbols) is repetitively transmitted in a specific band although it is not hopping.

And/or in the case of an SRS for UL BM resource, a configurable symbol number (within one slot) value itself may be defined/configured differently (independently) from an SRS resource for CSI acquisition. For example, a configurable symbol number (within one slot) value for UL BM may be defined/configured to be a smaller than value (e.g., only one symbol per one slot) for CSI acquisition.

And/or in the case of an SRS for UL BM resource, if hopping is permitted, although a hopping operation in a specific frequency-domain resource aspect is permitted, a specific restriction operation/rule that is not changed upon hopping may be defined/configured/indicated in the SRS Tx beam itself. For example, although hopping occurs (between symbols) with respect to "within one slot", an SRS Tx beam may not be changed (e.g., SRS Tx beam sweeping impossible within a slot). And/or an SRS Tx beam may be defined/configured/indicated to be changeable (or changed) (e.g., SRS Tx beam sweeping over several slots may be permitted/indicated/configured) "across slots" (only when specific (e.g., inter-slot and/or intra-slot) hopping is configured together).

And/or in the case of an SRS resource (for UL BM), "the same beam (of a specific level)" may be always defined/configured to be applied to one resource (e.g., SRS Tx beam sweeping impossible within an SRS resource (for UL BM)). And/or a different Tx beam may be applied between different SRS resources (for UL BM).

As a result, the Tx beam sweeping operation may be limited to be applied to (through) different SRS resources (for UL BM).

In the "indication (SRI) of an SRS resource transmitted by a UE in a previous time instance" described above in relation to the above SRI, the "previous time instance" may be defined/configured to mean an SRS transmission instance at which an SRS resource corresponding to an SRS resource ID indicated through the SRI has been most recently transmitted. That is, the indicated SRI in the slot n is associated with the most recent transmission of an SRS resource identified by the SRI, where the SRS resource is prior to the PDCCH carrying the SRI before the slot n.

For example, the "previous time instance (or the most recently transmitted SRS transmission instance)" may be considered to mean:
the most recently transmitted instance of periodically transmitted instances if an SRS resource indicated by an SRI is a periodic SRS resource,
the most recently transmitted instance of SRS Tx time instances if a plurality of the SRS Tx time instances is present after they are activated if an SRS resource indicated by an SRI is a semi-persistent SRS resource, and/or
the most recently transmitted instance if the transmission of an SRS resource corresponding to an SRS resource ID indicated by an SRI is present in plural times by aperiodic triggering if an SRS resource indicated by an SRI is an aperiodic SRS resource.

In the case of an SRS resource of a specific (for (UL) CSI acquisition) indicated by an SRI, in a Tx beam determination, separate indication may be received to comply with a Tx beam applied to another specific SRS resource (for UL BM) or separate indication may be received to comply with a (reception) beam (and a compatible transmission beam) applied to another specific DL RS (e.g., a CSI-RS (for DL BM) through a CSI-RS resource indicator (CSI)). In this case, since the applied Tx beam itself may vary over time, the most "recent instance" may be defined/configured as described above.

And/or in order to more secure/acquire the flexibility of the above-described "recent instance", a specific indicator to directly/specifically indicate the past transmission instance located at what place from the most recent instance may be provided to a UE in a form, such as a "recent y-th instance", instead of the "recent instance." For example, a y value (e.g., if the y value is defined/set to 2 bits, one value of y=0, 1, 2, 3 may be dynamically signaled/indicated/set) may be set/indicated along with (or separately from) an SRS received by through an UL grant. In this case, the y value may be interpreted and applied in a form, such as a "recent instance" identically with the above description if "y=0" is indicated and "the first previous instance from a recent instance" if "y=1" is indicated. That is, the y value may be interpreted and applied in a form, such as a "y-th previous instance from a recent instance" depending on an y value. A similar modified embodiment of the y value having such an intention may be considered to be included in the spirit of the present invention.

And/or an operation, such as the above-described "recent instance" and/or the "y-th previous instance from a recent instance" based on a y value, may be similarly/separately extended and applied to an application instance thereof although separate indication is provided so that the Tx beam of a specific SRS resource (for (UL) CSI acquisition) complies with a Tx beam applied in another SRS resource (for UL BM). That is, even in a method of indicating a Tx beam for another SRS resource, when a specific beam applied to another SRS resource (for BM) is indicated, if it is necessary to specify/indicate that the beam is a beam applied to which instance, an operation of specifying/indicating a beam applied to a "recent instance" or a beam applied to a "y-th previous instance from a recent instance" based on a y value may be defined/configured. In this case, a criterion for determining the "recent instance" may be an instance at which signaling (e.g., by (another type) of SRI) to indicate a specific beam applied to "another SRS resource (for BM) is transmitted/received (or an instance moved by a pre-defined/pre-configured instance from the corresponding instance)."

It is preferred to minimize (UL) DCI overhead. In such a meaning, to transmit SRS Tx beam indication signaling through a MAC CE may be preferred. The SRS Tx beam indication through the MAC CE does not lose dynamic indication flexibility because it dynamically triggers that which SRS resource(s) of a plurality of SRS resources (i.e., candidate resources) in which an SRS triggering field is pre-configured (through RRC signaling) will be transmitted. In other words, an SRS Tx beam may be dynamically indicated by the dynamic triggering of an SRS-resource level (i.e., each SRS resource, as described above, is controlled by a specific (another) Tx beam that may be controlled/indicated/configured by separate MAC CE signaling).

Accordingly, MAC CE signaling may be introduced along with the following two least signaling components:
a configured SRS resource #i (in order to control the Tx beam of such a #i-SRS resource) and/or
a beam used in SRI=n, CRI=m and/or SS block index=k (if necessary).

That is, MAC CE signaling to trigger/activate SRS transmission may include triggered SRS resource (or SRS resources, SRS resource set) identification information and another reference signal information to which a Tx beam to be associated/applied/used for the corresponding SRS resource has been applied. If triggered SRS transmission is SRS transmission of a "semi-persistent" type, candidate reference signals to which the same Tx beam (or space-relation/QCL assumption) as that of an SRS resource (or SRS resources, SRS resource set) may be previously configured/indicated through RRC signaling (e.g., through an RRC parameter "SRS-SpatialRelationInfo"). Selection information of a specific candidate reference signal to which the same Tx beam as that of an SRS resource (or SRS resources, SRS resource set) triggered through a corresponding MAC CE, among corresponding candidate reference signals, may be configured/indicated through a MAC CE. Alternatively, although candidate reference signals are previously configured/indicated through RRC signaling, indicated a reference signal separately indicated through a MAC CE may be preferentially selected/applied.

Accordingly, a new DCI field other than an SRI field (for PUSCH scheduling) and an SRS triggering field (for SRS transmission triggering for each SRS-resource-level) does not need to be introduced.

At the top of a PUSCH scheduling grant negotiated by the indication of an SRI/TRI/TPMI, one additional technology is to additionally define the default state of an SRI field. For example, the "00" codeword/state/value of the SRI field may be hard coded to comply with a beam used in the message 3 (UL Tx) of a random access channel (RACH) procedure. In this case, a message 1 may be for RACH transmission from a UE, a message 2 may be for a random access response (RAR) from a gNB, the message 3 may be for an initial RACH procedure from a UE based on an RAR, and a message 4 may be for confirmation from a gNB.

And/or any state/codepoint/value of an SRI field of an UL grant may be selectively configured to comply with a CRI or SS block index instead of indicating an SRS. However, in this case, since such an option is not related to UL-MIMO, a rank may be restricted to 1 (e.g., restricted to single port UL transmission) (without TRI/TPMI signaling or neglect TRI/TPMI signaling content).

The following embodiment may be proposed based on the above-described contents:

In SRS Tx beam determination, an SRI, CRI and/or SS block index may be indicated for each configured/triggered/enabled SRS resource.

For a PUSCH Tx beam determination, a basic UE operation complying with a beam used for a message 3 (e.g., if an SRI field is not configured) may be supported.

And/or any state/codepoint/value of an SRI field of an UL grant may be selectively configured to comply with a CRI or SS block index instead of indicating an SRS resource. However, in this case, since such an option is not related to UL-MIMO, a rank may be restricted to 1 (e.g., restricted to single port UL transmission) (without TRI/TPMI signaling or neglect TRI/TPMI signaling content).

And/or a specific DL (primary) serving-beam (SS block), (secondary) serving-beam (SS block), . . . , may be identified/distinguished (e.g., by a (DL) beam management procedure). As described above, an identified/distinguished beam-level identifier may be configured/applied/indicated for each SRI field codepoint/state/value.

For example, an SRI field (e.g., 2-bits) configured/included in a specific UL-related DCI may be configured/changed/indicated/updated as an RRC and/or MAC CE as follows:

"00": SS block index 2
"01": SRS resource 3
"10": SRS resource 7 (and/or optionally such SRS TX beam indication signaling may be jointly encoded/added. For example, the Tx beam of the SRS resource 7 may comply with the Tx beam of SRI=n, CRI=m or SS block index=k)
"11": CRI 4

And/or in an example of such coding, an SRS resource(s) may be basically indicated in the description of each state/codepoint/value of a specific DCI/field (e.g., ASRS field) to indicate SRS transmission triggering. Tx beam-related/indication/configuration information to be applied to an indicated SRS resource(s) may be joint-encoded and included (refer to the following ASRS field example).

State/codepoint/value embodiment of an ASRS field:
"00": SRS resource 2
"01": SRS resource 3, SRS resource 5
"10": SRS resource 7 (and/or optionally such SRS TX beam indication signaling may be jointly encoded/added. For example, the Tx beam of the SRS resource 7 may comply with the Tx beam of SRI=n, CRI=m or SS block index=k)
"11": . . .

As described above, assuming that a Tx beam is indicated in the "SRI=n, CRI=m or SS block index=k" form, an operation for a UE to adaptively change and apply a beam direction, modified by the rotation of a UE and/or a channel variation after the indicated TX beam is applied, autonomously (gNB-transparently) may be taken into consideration. For example, if a base station indicates CRI=3, it means that UL transmission should be performed in a Tx beam direction corresponding to/compatible with the Rx beam direction of a UE that has received a DL CSI-RS #3. Accordingly, this may be interpreted as a meaning that the UE may autonomously correct/apply a Tx beam by considering the possibility that a Tx beam direction may have been changed due to a cause, the rotation of the UE and/or a channel variation compared to the past instance at which the DL CSI-RS #3 was received.

FIG. 15 is a flowchart illustrating an SRS transmission method of a UE according to an embodiment of the present invention. The description regarding the above-described embodiment in relation to this flowchart may be applied identically/similarly, and a redundant description is omitted below.

First, at least one SRS resource set may be configured in a UE from a base station (S1510). In this case, the at least one SRS resource set may be configured through RRC signaling.

Next, the UE may receive activation indication information/command indicating the SRS transmission activation of a specific SRS resource set of the at least one SRS resource set from the base station (S1520).

Next, the UE may perform SRS transmission corresponding to the specific SRS resource set with respect to the base station (S1530). In this case, a target reference signal to which spatial relationship assumption (i.e., QCL assumption or the assumption of the same Tx beam) is applied for each SRS resource included in the specific SRS resource set may be determined based on the activation indication information. In this case, the type of a target reference signal may include an SRS, a CSI-RS and/or an SS block.

In one embodiment, the type of at least one SRS resource included in the specific SRS resource set may be configured in a semi-persistent type. In this case, the target reference signal of at least one SRS resource configured in the semi-persistent type may be explicitly indicated by activation indication information. Specifically, the activation indication information may be included/indicated in the type of target reference signal information and offset/ID information. In this case, the activation indication may be received by a UE through MAC CE signaling.

In another embodiment, the type of at least one SRS resource included in the specific SRS resource set may be configured in an aperiodic type. In this case, activation indication may be received through DCI signaling. Furthermore, the target reference signal may be determined as a reference signal (separately) configured/associated with respect to the at least one SRS resource configured in the aperiodic type (within a specific SRS set activated by the activation indication information). In this case, the reference signal configured with respect to the at least one SRS resource may correspond to a reference signal (e.g., configuration/indicated through a higher layers parameter "SRS-SpatialRelationInfo") in which a spatial relationship assumption (i.e., QCL assumption or the assumption of the same Tx beam) has been configured for each at least one SRS resource through RRC signaling.

And/or slot offset information where the SRS transmission of the specific SRS resource set configured in the aperiodic type may also be configured/indicated separately (e.g., through RRC signaling). And/or an OFDM symbol location may be configured/indicated separately (e.g., through RRC signaling) for each SRS resource included in the specific SRS resource set.

Meanwhile, although not shown in this flowchart, the UE may receive an SRI indicating a specific SRS resource for uplink transmission. In this case, the SRI may be transmitted in association with the most recent SRS transmission of SRS transmissions for an SRS resource identified by the SRI. That is, the UE may interpret that the SRS resource indicated by the SRI means/indicates a most recently transmitted SRS resource among the transmissions of at least one SRS resource that may be identified by the corresponding SRI.

General Apparatus to which the Present Invention May be Applied

FIG. 16 illustrates a block diagram of a wireless communication apparatus according to an embodiment of the present invention.

Referring to FIG. 16, the wireless communication system includes an eNB 1610 and multiple UEs 1620 disposed within the area of the eNB 1610.

The eNB 1610 includes a processor 1611, memory 1612 and a radio frequency unit (RF unit) 1613. The processor 1611 implements the above-proposed functions, processes and/or methods. The layers of a radio interface protocol may be implemented by the processor 1611. The memory 1612 is connected to the processor 1611 and stores various types of information for driving the processor 1611. The RF unit 1613 is connected to the processor 1611 and transmits and/or receives radio signals.

The UE 1620 includes a processor 1621, memory 1622 and an RF unit 1623. The processor 1621 implements the above-proposed functions, processes and/or methods. The layers of a radio interface protocol may be implemented by the processor 1621. The memory 1622 is connected to the processor 1621 and stores various types of information for driving the processor 1621. The RF unit 1623 is connected to the processor 1621 and transmits and/or receives radio signals.

The memory 1612, 1622 may be positioned inside or outside the processor 1611, 1621 and may be connected to the processor 1611, 1621 by well-known means. Furthermore, the eNB 1610 and/or the UE 1620 may have a single antenna or multiple antennas.

FIG. 17 is a diagram showing an example of the RF module of a wireless communication apparatus to which a method proposed in this specification may be applied.

Specifically, FIG. 17 shows an example of an RF module which may be implemented in a frequency division duplex (FDD) system.

First, in a transmission path, the above-described processor processes data to be transmitted and provides an analog output signal to a transmitter 1710.

In the transmitter 1710, the analog output signal is filtered by a low pass filter (LPF) 1711 in order to remove images caused by digital-to-analog conversion (ADC). The signal is up-converted from a baseband to an RF by a mixer 1712 and is amplified by a variable gain amplifier (VGA) 1713. The amplified signal is filtered by a filter 1714, additionally amplified by a power amplifier (PA) 1715, routed by a duplexer(s) 1750/antenna switch(es) 1760, and transmitted through an antenna 1770.

Furthermore, in a reception path, the antenna 1770 receives signals from the outside and provides the received signals. The signals are routed by the antenna switch(es) 1760/duplexers 1750 and provided to a receiver 1720.

In the receiver 1720, the received signals are amplified by a low noise amplifier (LNA) 1723, filtered by a band pass filter 1724, and down-converted from the RF to the baseband by a mixer 1725.

The down-converted signal is filtered by a low pass filter (LPF) 1726 and amplified by a VGA 1727, thereby obtaining the analog input signal. The analog input signal is provided to the above-described processor.

Furthermore, a local oscillator (LO) 1740 generates transmission and reception LO signals and provides them to the mixer 1712 and the mixer 1725, respectively.

Furthermore, a phase locked loop (PLL) 1730 receives control information from the processor in order to generate transmission and reception LO signals in proper frequencies, and provides control signals to the local oscillator 1740.

FIG. 18 is a diagram showing another example of the RF module of a wireless communication apparatus to which a method proposed in this specification may be applied.

Specifically, FIG. 13 shows an example of an RF module that may be implemented in a time division duplex (TDD) system.

The transmitter 1810 and receiver 1820 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 10 for the same structure.

A signal amplified by the power amplifier (PA) 1815 of the transmitter is routed through a band select switch 1850, a band pass filter (BPF) 1860 and an antenna switch(es) 1870 and is transmitted through an antenna 1880.

Furthermore, in a reception path, the antenna 1880 receives signals from the outside and provides the received signals. The signals are routed through the antenna switch(es) 1870, the band pass filter 1860 and the band select switch 1850 and are provided to the receiver 1820.

In the above-described embodiments, the elements and characteristics of the present invention have been combined in specific forms. Each of the elements or characteristics may be considered to be optional unless otherwise described explicitly.

Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

Meanwhile, in this specification, "A and/or B" may be interpreted as meaning at least one of A and/or B.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations may be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems or 5G system, but may be applied to various wireless communication systems in addition to the 3GPP LTE/LTE-A systems or 5G system.

The invention claimed is:

1. A method for transmitting, by a user equipment (UE), a sounding reference signal (SRS) in a wireless communication system, the method comprising:
receiving, from a base station, a configuration for aperiodic SRS transmission, via radio resource control (RRC) signaling,
wherein the configuration includes (i) first information for a slot offset between downlink control information (DCI) triggering an aperiodic SRS and transmission of the aperiodic SRS and (ii) second information for association between a code point of the DCI triggering the aperiodic SRS and each SRS resource set,
wherein each SRS resource set includes one or more SRS resources, and
wherein the first information for the slot offset is configured for each SRS resource set;
receiving, from the base station, the DCI triggering the aperiodic SRS in a first slot,
wherein the DCI triggering the aperiodic SRS includes a field for triggering of a SRS resource set,
wherein a specific code point is configured by the field, and
wherein a specific SRS resource set associated with the specific code point based on the second information is triggered based on the specific code point; and
transmitting, to the base station, the aperiodic SRS in the specific SRS resource set in a second slot, wherein the second slot is determined based on a slot-offset related with the specific SRS resource set and the first slot.

2. The method of claim 1, further comprising:
receiving an SRS resource indicator (SRI) related to a specific SRS resource for uplink transmission of the UE,
wherein a plurality of SRS transmissions based on the specific SRS resource are performed prior to reception of the SRI, and
wherein the SRI is associated with a most recent SRS transmission among the plurality of SRS transmissions.

3. The method of claim 1, wherein a symbol location in the second slot for the aperiodic SRS is configured per each SRS resource of the specific SRS resource set.

4. The method of claim 1, wherein information related to a frequency hopping of the aperiodic SRS is configured per each SRS resource of the specific SRS resource set.

5. The method of claim 1,
wherein the configuration further includes information for a spatial relation between the aperiodic SRS and a reference signal,
wherein the information for the spatial relation is configured for each of the one or more SRS resources, and
wherein the aperiodic SRS is transmitted based on the spatial relation.

6. The method of claim 5, further comprising:
receiving, from the base station, update information for the spatial relation, via MAC CE,
wherein the spatial relation is updated based on the update information and updated spatial relation is applied to the aperiodic SRS.

7. The method of claim 6,
wherein the reference signal is updated to another reference signal.

8. A user equipment (UE) configured to operate in a wireless communication system, the UE comprising:
a transceiver;
at least one processor; and
at least one computer memory operably connectable to the at least one processor and storing instructions that, based on being executed by the at least one processor, to perform operations comprising:
receiving, from a base station through the transceiver, a configuration for aperiodic SRS transmission, via radio resource control (RRC) signaling,
wherein the configuration includes (i) first information for a slot offset between downlink control information (DCI) triggering an aperiodic SRS and transmission of the aperiodic SRS and (ii) second information for association between a code point of the DCI triggering the aperiodic SRS and each SRS resource set,
wherein each SRS resource set includes one or more SRS resources, and
wherein the first information of the slot offset is configured for each SRS resource set;
receiving, from the base station through the transceiver, the DCI triggering the aperiodic SRS in a first slot,
wherein the DCI triggering the aperiodic SRS includes a field for triggering a SRS resource set,
wherein a specific code point is configured by the field, and
wherein a specific SRS resource set associated with the specific code point based on the second information is triggered based on the specific code point; and transmitting, to the base station through the transceiver, the aperiodic SRS in the specific SRS resource set in a second slot, wherein the second slot is determined based on a slot-offset related with the specific SRS resource set and the first slot.

9. The UE of claim 8, wherein the operations further comprise:

receiving an SRS resource indicator (SRI) related to a specific SRS resource for uplink transmission of the UE, wherein a plurality of SRS transmissions based on the specific SRS resource are performed prior to reception of the SRI, and wherein the SRI is associated with a most recent SRS transmission among the plurality of SRS transmissions.

10. The UE of claim 8, wherein a symbol location in the second slot for the aperiodic SRS is configured per each SRS resource of the specific SRS resource set.

11. The UE of claim 8, wherein information related to a frequency hopping of the aperiodic SRS is configured per each SRS resource of the specific SRS resource set.

12. A Base Station (BS) configured to operate in a wireless communication system, the BS comprising:

a transceiver;

at least one processor; and at least one computer memory operably connectable to the at least one processor and storing instructions that, based on being executed by the at least one processor, perform operations comprising:

transmitting, to a user equipment (UE), a configuration for aperiodic SRS transmission, via radio resource control (RRC) signaling, wherein the configuration includes (i) first information for a slot offset between downlink control information (DCI) triggering an aperiodic SRS and transmission of the aperiodic SRS and (ii) second information for association between a code point of the DCI triggering the aperiodic SRS and each SRS resource set, wherein each SRS resource set includes one or more SRS resources, and wherein the first information of the slot offset is configured for each SRS resource set;

transmitting, to the UE, the DCI triggering the aperiodic SRS in a first slot, wherein the DCI triggering the aperiodic SRS includes a field for triggering a SRS resource set, wherein a specific code point is configured by the field, wherein a specific SRS resource set associated with the specific code point based on the second information is triggered based on the specific code point; and receiving, from the UE, the aperiodic SRS in the specific SRS resource set in a second slot, wherein the second slot is determined based on a slot-offset related with the specific SRS resource set and the first slot.

13. The BS of claim 12, wherein a symbol location for the aperiodic SRS in the second slot is configured per each SRS resource of the specific SRS resource set.

14. The BS of claim 12, wherein information related to a frequency hopping of the aperiodic SRS is configured per each SRS resource of the specific SRS resource set.

* * * * *